United States Patent
Chen et al.

(10) Patent No.: US 10,330,254 B2
(45) Date of Patent: Jun. 25, 2019

(54) METHOD AND SYSTEM FOR STABILIZING A PAYLOAD

(71) Applicant: SZ DJI OSMO TECHNOLOGY CO., LTD., Shenzhen (CN)

(72) Inventors: Zihan Chen, Shenzhen (CN); Dahu Pan, Shenzhen (CN); Jingyuan Wang, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/112,163

(22) Filed: Aug. 24, 2018

(65) Prior Publication Data
US 2019/0011077 A1   Jan. 10, 2019

Related U.S. Application Data

(63) Continuation of application No. PCT/CN2016/074729, filed on Feb. 26, 2016.

(51) Int. Cl.
*B64D 47/00* (2006.01)
*F16M 13/02* (2006.01)
(Continued)

(52) U.S. Cl.
CPC .............. *F16M 13/02* (2013.01); *B64C 17/00* (2013.01); *F16M 11/10* (2013.01); *F16M 11/2071* (2013.01); *G03B 15/006* (2013.01); *G03B 17/561* (2013.01); *G05B 6/02* (2013.01); *G05D 3/20* (2013.01); *B64C 39/024* (2013.01);
(Continued)

(58) Field of Classification Search
CPC ..... G03B 17/561; G03B 15/006; F16M 13/02
See application file for complete search history.

(56) References Cited

U.S. PATENT DOCUMENTS

2012/0316685 A1* 12/2012 Pettersson ................ F16F 3/00
                                                          700/275

FOREIGN PATENT DOCUMENTS

CN     202499280 U     10/2012
CN     203686509 U     7/2014
(Continued)

OTHER PUBLICATIONS

The World Intellectual Property Organization (WIPO). International Search Report and Written Opinion for PCT/CN2016/074729 dated Nov. 30, 2016 6 pages.

*Primary Examiner* — Minh Q Phan
(74) *Attorney, Agent, or Firm* — Anova Law Group, PLLC

(57) ABSTRACT

An apparatus includes a carrier, one or more first sensors, one or more second sensors, and one or more processors. The carrier includes a first frame and a second frame. A payload is affixed to the first frame. The second frame is rotatably coupled to a movable object. The one or more first sensors are disposed on the payload and configured to measure one or more motion characteristics of the payload. The one or more second sensors are disposed on the carrier and configured to measure one or more motion characteristics of the carrier. The one or more processors are configured to determine an input torque based on the one or more motion characteristics of the payload, determine an estimated disturbance torque based on the one or more motion characteristics of the carrier, and calculate an output torque based on the input torque and the estimated disturbance torque.

20 Claims, 11 Drawing Sheets

(51) Int. Cl.
- *F16M 11/10* (2006.01)
- *F16M 11/20* (2006.01)
- *G03B 15/00* (2006.01)
- *G03B 17/56* (2006.01)
- *G05B 6/02* (2006.01)
- *G05D 3/20* (2006.01)
- *B64C 17/00* (2006.01)
- *B64C 39/02* (2006.01)
- *B64D 47/08* (2006.01)
- *G05D 1/00* (2006.01)

(52) U.S. Cl.
CPC .. *B64C 2201/024* (2013.01); *B64C 2201/027* (2013.01); *B64C 2201/127* (2013.01); *B64C 2201/146* (2013.01); *B64D 47/08* (2013.01); *G05D 1/0094* (2013.01)

(56) References Cited

FOREIGN PATENT DOCUMENTS

| | | |
|---|---|---|
| CN | 203819500 U | 9/2014 |
| CN | 204879319 U | 12/2015 |
| WO | 2016015232 A1 | 2/2016 |

\* cited by examiner

METHOD AND SYSTEM FOR STABILIZING A PAYLOAD

CROSS-REFERENCE TO RELATED APPLICATION

This application is a continuation of International Application No. PCT/CN2016/074729, filed on Feb. 26, 2016, the entire contents of which are incorporated herein by reference.

BACKGROUND OF THE DISCLOSURE

Unmanned vehicles such as unmanned aerial vehicles (UAVs) can be used for performing surveillance, reconnaissance, and exploration tasks for a wide variety of civilian, commercial, and military applications. A UAV may be manually controlled by a remote user, or may operate in a semi-autonomous or fully autonomous manner. Such UAVs can include a carrier used to support payloads such as cameras for obtaining image data of a target object.

Prior approaches for controlling a payload carried by a UAV may not be optimal in some instances. For instance, prior methods for stabilizing a payload may not be adapted to compensate for external disturbances to the carrier and payload and may not account for the specific mechanical characteristics of the carrier, which may reduce the accuracy of control of the payload.

SUMMARY OF THE DISCLOSURE

The present disclosure provides systems, methods, and devices related to the control and operation of a carrier for supporting a payload for a movable object such as an unmanned aerial vehicle (UAV). In some embodiments, a carrier is used to mechanically couple a payload to a movable object and control the position and/or orientation of the payload relative to the movable object. However, during operation, the carrier may be subject to external disturbances (e.g., wind, temperature changes, external impacts, etc.) that may affect the carrier configuration. Additionally, the motion characteristics of different types of carriers and payloads may influence their response to actuation. The embodiments disclosed herein can estimate and compensate for such factors, thus improving the accuracy of controlling the payload position and/or orientation using the carrier.

In one aspect, a method for controlling an attitude of a payload is provided, the method comprising: determining an input torque based on an input angle and one or more motion characteristics of the payload, wherein the input angle is associated with a desired attitude of the payload; determining an estimated disturbance torque based on one or more motion characteristics of a carrier to which the payload is coupled, wherein the estimated disturbance torque is associated with a disturbance to the carrier; and calculating an output torque based on the input torque and the estimated disturbance torque, wherein the output torque is used to effect movement of the carrier to achieve the desired attitude of the payload.

In some embodiments, the carrier is rotatably coupled to a movable object for supporting the carrier.

In some embodiments, the carrier is a multi-axis gimbal.

In some embodiments, the movable object is a UAV.

In some embodiments, the carrier is configured to rotate relative to the movable object about one or more rotational axes. The output torque can be applied about the one or more rotational axes.

In some embodiments, the carrier comprises a plurality of frames comprising at least a first frame and a second frame. The payload can be affixed to the first frame. The second frame can be rotatably coupled to the movable object. The second frame can be configured to rotate about a yaw axis.

In some embodiments, the second frame is coupled to the movable object via a damping element.

In some embodiments, the payload is serially connected to the movable object by the first frame and the second frame. The second frame can be coupled between the movable object and the first frame.

In some embodiments, the one or more motion characteristics of the carrier comprise at least a linear acceleration or an angular acceleration of the second frame. The one or more motion characteristics of the second frame can be measured using one or more sensors located in proximity to the second frame. The one or more sensors can comprise at least one of an accelerometer or a gyroscope.

In some embodiments, the one or more sensors are further configured to measure one or more motion characteristics of the second frame when coupled to the movable object via a damping element. The damping element can be configured to reduce an effect of the disturbance on the second frame. The damping element can be configured to absorb vibration of the second frame. The one or more sensors can be directly disposed on a coupling structure connecting the damping element to the second frame. The one or more sensors can be provided on a flexible printed circuit (FPC) attached onto the coupling structure. The one or more sensors can be positioned along an axis of rotation of the second frame.

In some embodiments, the output torque is applied via an actuator coupled to the second frame. The actuator can be a motor comprising a rotor and a stator. The rotor can be coupled to the second frame and the stator can be coupled to the movable object.

In some embodiments, the one or more motion characteristics of the carrier are measured using an inertial sensor disposed on a frame of the carrier. The estimated disturbance torque can be determined by a rotation matrix transformation comprising measurements of the one or more motion characteristics of the carrier.

In some embodiments, the input angle is provided by a user using an external device in communication with the payload.

In some embodiments, the input angle is provided to one or more processors in a motion controller on the payload. The motion controller can be configured to calculate the output torque based on the input torque and the estimated disturbance torque. The motion controller can be configured to control an actuator that is coupled to the carrier to rotate at the output torque, so as to effect the movement of the carrier to achieve the desired attitude of the payload.

In some embodiments, the one or more motion characteristics of the payload comprise at least one of an instantaneous attitude, an instantaneous position, an angular velocity, a linear velocity, an angular acceleration, or a linear acceleration of the payload. The one or more motion characteristics of the payload can be measured using one or more sensors located on the payload. The one or more sensors can collectively constitute an inertial measurement unit (IMU).

In some embodiments, the disturbance comprises one or more of wind effects, temperature changes, or external impact to the payload or the carrier.

In some embodiments, the estimated disturbance torque is determined by inputting one or more motion characteristics of a damping element into a predefined dynamics-based model of the carrier. The damping element can be disposed between the movable object and a frame of the carrier. The one or more motion characteristics of the damping element can be measured using one or more sensors disposed on the damping element. The one or more sensors can be provided on a flexible printed circuit (FPC) attached onto the damping element. The one or more motion characteristics of the damping element can comprise at least a linear acceleration or an angular acceleration of the damping element. The one or more motion characteristics of the damping element can be associated with the one or more motion characteristics of the frame.

In some embodiments, the estimated disturbance torque is calculated with respect to a rotatable joint on a frame of the carrier and the rotatable joint is configured to couple the frame to the movable object.

In some embodiments, the method further comprises: further refining the estimated disturbance torque using a proportional-derivative (PD) controller. The estimated disturbance torque can be refined by applying one or more filters to the estimated disturbance torque. The method can further comprise: calculating the output torque based on the input torque and the refined disturbance torque.

In some embodiments, the input torque is determined using a feedback control loop. The feedback control loop can be implemented using at least one proportional-derivative (PD) controller. A first PD controller can be configured to calculate an input angular velocity based on a difference between an instantaneous angle measured by one or more sensors on the payload and the input angle. A second PD controller can be configured to calculate the input torque based on a difference between an instantaneous angular velocity measured by the one or more sensors on the payload and the input angular velocity.

In some embodiments, the output torque is calculated by compensating the input torque with the estimated disturbance torque. The output torque can be calculated by subtracting the estimated disturbance torque from the input torque. The output torque can be used in conjunction with an actual disturbance torque from the disturbance to effect the movement of the carrier, so as to achieve the desired attitude of the payload. The actual disturbance torque can be applied to a frame of the carrier coupled to the movable object.

In another aspect, an apparatus for controlling an attitude of a payload is provided, the apparatus comprising one or more processors that are, individually or collectively, configured to: determine an input torque based on an input angle and one or more motion characteristics of the payload, wherein the input angle is associated with a desired attitude of the payload; determine an estimated disturbance torque based on one or more motion characteristics of a carrier to which the payload is coupled, wherein the estimated disturbance torque is associated with a disturbance to the carrier; and calculate an output torque based on the input torque and the estimated disturbance torque, herein the output torque is used to effect movement of the carrier to achieve the desired attitude of the payload.

In some embodiments, the carrier is rotatably coupled to a movable object for supporting the carrier.

In some embodiments, the carrier is a multi-axis gimbal.

In some embodiments, the movable object is a UAV.

In some embodiments, the carrier is configured to rotate relative to the movable object about one or more rotational axes. The output torque can be applied about the one or more rotational axes.

In some embodiments, the carrier comprises a plurality of frames comprising at least a first frame and a second frame. The payload can be affixed to the first frame. The second frame can be rotatably coupled to the movable object. The second frame can be configured to rotate about a yaw axis.

In some embodiments, the second frame is coupled to the movable object via a damping element.

In some embodiments, the payload is serially connected to the movable object by the first frame and the second frame. The second frame can be coupled between the movable object and the first frame.

In some embodiments, the one or more motion characteristics of the carrier comprise at least a linear acceleration or an angular acceleration of the second frame. The one or more motion characteristics of the second frame can be measured using one or more sensors located in proximity to the second frame. The one or more sensors can comprise at least one of an accelerometer or a gyroscope.

In some embodiments, the one or more sensors are further configured to measure one or more motion characteristics of the second frame when coupled to the movable object via a damping element. The damping element can be configured to reduce an effect of the disturbance on the second frame. The damping element can be configured to absorb vibration of the second frame. The one or more sensors can be directly disposed on a coupling structure connecting the damping element to the second frame. The one or more sensors can be provided on a flexible printed circuit (FPC) attached onto the coupling structure. The one or more sensors can be positioned along an axis of rotation of the second frame.

In some embodiments, the output torque is applied via an actuator coupled to the second frame. The actuator can be a motor comprising a rotor and a stator. The rotor can be coupled to the second frame and the stator can be coupled to the movable object.

In some embodiments, the one or more motion characteristics of the carrier are measured using an inertial sensor disposed on a frame of the carrier. The estimated disturbance torque can be determined by a rotation matrix transformation comprising measurements of the one or more motion characteristics of the carrier.

In some embodiments, the input angle is provided by a user using an external device in communication with the payload.

In some embodiments, the input angle is provided to one or more processors in a motion controller on the payload. The motion controller can be configured to calculate the output torque based on the input torque and the estimated disturbance torque. The motion controller can be configured to control an actuator that is coupled to the carrier to rotate at the output torque, so as to effect the movement of the carrier to achieve the desired attitude of the payload.

In some embodiments, the one or more motion characteristics of the payload comprise at least one of an instantaneous attitude, an instantaneous position, an angular velocity, a linear velocity, an angular acceleration, or a linear acceleration of the payload. The one or more motion characteristics of the payload can be measured using one or more sensors located on the payload. The one or more sensors can collectively constitute an inertial measurement unit (IMU).

In some embodiments, the disturbance comprises one or more of wind effects, temperature changes, or external impact to the payload or the carrier.

In some embodiments, the estimated disturbance torque is determined by inputting one or more motion characteristics of a damping element into a predefined dynamics-based model of the carrier. The damping element can be disposed between the movable object and a frame of the carrier. The one or more motion characteristics of the damping element can be measured using one or more sensors disposed on the damping element. The one or more sensors can be provided on a flexible printed circuit (FPC) attached onto the damping element. The one or more motion characteristics of the damping element can comprise at least a linear acceleration or an angular acceleration of the damping element. The one or more motion characteristics of the damping element can be associated with the one or more motion characteristics of the frame.

In some embodiments, the estimated disturbance torque is calculated with respect to a rotatable joint on a frame of the carrier and the rotatable joint is configured to couple the frame to the movable object.

In some embodiments, the one or more processors are configured to further refine the estimated disturbance torque using a proportional-derivative (PD) controller. The estimated disturbance torque can be refined by applying one or more filters to the estimated disturbance torque. The one or more processors can be configured to calculate the output torque based on the input torque and the refined disturbance torque.

In some embodiments, the input torque is determined using a feedback control loop. The feedback control loop can be implemented using at least one proportional-derivative (PD) controller. A first PD controller can be configured to calculate an input angular velocity based on a difference between an instantaneous angle measured by one or more sensors on the payload and the input angle. A second PD controller can be configured to calculate the input torque based on a difference between an instantaneous angular velocity measured by the one or more sensors on the payload and the input angular velocity.

In some embodiments, the output torque is calculated by compensating the input torque with the estimated disturbance torque. The output torque can be calculated by subtracting the estimated disturbance torque from the input torque. The output torque can be used in conjunction with an actual disturbance torque from the disturbance to effect the movement of the carrier, so as to achieve the desired attitude of the payload. The actual disturbance torque can be applied to a frame of the carrier coupled to the movable object.

In another aspect, a non-transitory computer-readable medium storing instructions is provided. The instructions, when executed, cause a computer to perform a method for controlling an attitude of a payload, the method comprising: determining an input torque based on an input angle and one or more motion characteristics of the payload, wherein the input angle is associated with a desired attitude of the payload; determining an estimated disturbance torque based on one or more motion characteristics of a carrier to which the payload is coupled, wherein the estimated disturbance torque is associated with a disturbance to the carrier; and calculating an output torque based on the input torque and the estimated disturbance torque, wherein the output torque is used to effect movement of the carrier to achieve the desired attitude of the payload.

In another aspect, a system for controlling an attitude of a payload is provided, the system comprising: a movable object; a carrier configured to couple the payload to the movable object; and one or more processors that are, individually or collectively, configured to: determine an input torque based on an input angle and one or more motion characteristics of the payload, wherein the input angle is associated with a desired attitude of the payload; determine an estimated disturbance torque based on one or more motion characteristics of a carrier to which the payload is coupled, wherein the estimated disturbance torque is a result of a disturbance to the carrier; and calculate an output torque based on the input torque and the estimated disturbance torque, wherein the output torque is used to effect movement of the carrier to achieve the desired attitude of the payload.

In some embodiments, the carrier is rotatably coupled to the movable object for supporting the carrier.

In some embodiments, the carrier is a multi-axis gimbal.

In some embodiments, the movable object is a UAV.

In some embodiments, the carrier is configured to rotate relative to the movable object about one or more rotational axes. The output torque can be applied about the one or more rotational axes.

In some embodiments, the carrier comprises a plurality of frames comprising at least a first frame and a second frame. The payload can be affixed to the first frame. The second frame can be rotatably coupled to the movable object. The second frame can be configured to rotate about a yaw axis.

In some embodiments, the second frame is coupled to the movable object via a damping element.

In some embodiments, the payload is serially connected to the movable object by the first frame and the second frame. The second frame can be coupled between the movable object and the first frame.

In some embodiments, the one or more motion characteristics of the carrier comprise at least a linear acceleration or an angular acceleration of the second frame. The one or more motion characteristics of the second frame can be measured using one or more sensors located in proximity to the second frame. The one or more sensors can comprise at least one of an accelerometer or a gyroscope.

In some embodiments, the one or more sensors are further configured to measure one or more motion characteristics of the second frame when coupled to the movable object via a damping element. The damping element can be configured to reduce an effect of the disturbance on the second frame. The damping element can be configured to absorb vibration of the second frame. The one or more sensors can be directly disposed on a coupling structure connecting the damping element to the second frame. The one or more sensors can be provided on a flexible printed circuit (FPC) attached onto the coupling structure. The one or more sensors can be positioned along an axis of rotation of the second frame.

In some embodiments, the output torque is applied via an actuator coupled to the second frame. The actuator can be a motor comprising a rotor and a stator. The rotor can be coupled to the second frame and the stator can be coupled to the movable object.

In some embodiments, the one or more motion characteristics of the carrier are measured using an inertial sensor disposed on a frame of the carrier. The estimated disturbance torque can be determined by a rotation matrix transformation comprising measurements of the one or more motion characteristics of the carrier.

In some embodiments, the input angle is provided by a user using an external device in communication with the payload.

In some embodiments, the input angle is provided to one or more processors in a motion controller on the payload. The motion controller an be configured to calculate the output torque based on the input torque and the estimated disturbance torque. The motion controller can be configured to control an actuator that is coupled to the carrier to rotate at the output torque, so as to effect the movement of the carrier to achieve the desired attitude of the payload.

In some embodiments, the one or more motion characteristics of the payload comprise at least one of an instantaneous attitude, an instantaneous position, an angular velocity, a linear velocity, an angular acceleration, or a linear acceleration of the payload. The one or more motion characteristics of the payload can be measured using one or more sensors located on the payload. The one or more sensors can collectively constitute an inertial measurement unit (IMU).

In some embodiments, the disturbance comprises one or more of wind effects, temperature changes, or external impact to the payload or the carrier.

In some embodiments, the estimated disturbance torque is determined by inputting one or more motion characteristics of a damping element into a predefined dynamics-based model of the carrier. The damping element can be disposed between the movable object and a frame of the carrier. The one or more motion characteristics of the damping element can be measured using one or more sensors disposed on the damping element. The one or more sensors can be provided on a flexible printed circuit (FPC) attached onto the damping element. The one or more motion characteristics of the damping element can comprise at least a linear acceleration or an angular acceleration of the damping element. The one or more motion characteristics of the damping element can be associated with the one or more motion characteristics of the frame.

In some embodiments, the estimated disturbance torque is calculated with respect to a rotatable joint on a frame of the carrier and the rotatable joint is configured to couple the frame to the movable object.

In some embodiments, the method further comprises: further refining the estimated disturbance torque using a proportional-derivative (PD) controller. The estimated disturbance torque can be refined by applying one or more filters to the estimated disturbance torque. The method can further comprise: calculating the output torque based on the input torque and the refined disturbance torque.

In some embodiments, the input torque is determined using a feedback control loop. The feedback control loop can be implemented using at least one proportional-derivative (PD) controller. A first PD controller can be configured to calculate an input angular velocity based on a difference between an instantaneous angle measured by one or more sensors on the payload and the input angle. A second PD controller can be configured to calculate the input torque based on a difference between an instantaneous angular velocity measured by the one or more sensors on the payload and the input angular velocity.

In some embodiments, the output torque is calculated by compensating the input torque with the estimated disturbance torque. The output torque can be calculated by subtracting the estimated disturbance torque from the input torque. The output torque can be used in conjunction with an actual disturbance torque from the disturbance to effect the movement of the carrier, so as to achieve the desired attitude of the payload. The actual disturbance torque can be applied to a frame of the carrier coupled to the movable object.

In another aspect, an apparatus for controlling an attitude of a payload is provided, comprising: a carrier comprising at least a first frame and a second frame, wherein the payload is affixed to the first frame and the second frame is rotatably coupled to a movable object; one or more sensors disposed on the payload, wherein the sensors are configured to measure one or more motion characteristics of the payload; one or more sensors disposed on the carrier, wherein the sensors are configured to measure one or more motion characteristics of the carrier; and one or more processors that are, individually or collectively, configured to: determine an input torque based on the one or more motion characteristics of the payload; determine an estimated disturbance torque based on the one or more motion characteristics of the carrier; and calculate an output torque based on the input torque and the estimated disturbance torque, wherein the output torque is configured to effect movement of the second frame to achieve a desired attitude of the payload.

In some embodiments, the carrier is a multi-axis gimbal.

In some embodiments, the apparatus further comprises the movable object.

In some embodiments, the apparatus further comprises a damping element disposed between the movable object and the carrier. The second frame can be coupled to the movable object via the damping element. The second frame can be coupled to the damping element via a coupling structure, and the one or more sensors can be disposed on the coupling structure. The one or more sensors can be provided on a flexible printed circuit (FPC) attached onto the coupling structure. The damping element can be configured to reduce an effect of a disturbance on the carrier. The damping element can be configured to absorb vibration of the second frame.

In some embodiments, the second frame is coupled to a motor configured to rotate the second frame about a yaw axis and wherein the one or more sensors are disposed on the second frame or the motor.

In some embodiments, the estimated disturbance torque is determined by inputting one or more motion characteristics of the carrier into a predefined dynamics-based model of the carrier. The one or more motion characteristics of the carrier can comprise at least a linear acceleration or an angular acceleration of the carrier. The one or more motion characteristics of the carrier can be associated with one or more motion characteristics of the second frame.

In some embodiments, the estimated disturbance torque is calculated with respect to a rotatable joint on the second frame, the rotatable joint configured to couple the second frame to the movable object.

In some embodiments, the estimated disturbance torque is further refined using a proportional-derivative (PD) controller. The estimated disturbance torque can be refined by applying one or more filters to the estimated disturbance torque. The output torque can be calculated based on the input torque and the refined disturbance torque.

In some embodiments, the input torque is determined using a feedback control loop. The feedback control loop can be implemented using at least one proportional-derivative (PD) controller. A first PD controller can be configured to calculate an input angular velocity based on a difference between an instantaneous angle measured by the one or more sensors on the payload and the input angle. A second PD controller can be configured to calculate the input torque based on a difference between an instantaneous angular velocity measured by the one or more sensors on the payload and the input angular velocity.

In some embodiments, the output torque is calculated by compensating the input torque with the estimated disturbance torque. The output torque can be calculated by subtracting the estimated disturbance torque from the input torque. The output torque can be used in conjunction with an actual disturbance torque to effect the movement of the carrier, so as to achieve the desired attitude of the payload. The actual disturbance torque can result from a disturbance to the carrier. The actual disturbance torque can be applied to the second frame.

Other objects and features of the present disclosure will become apparent upon review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE EMBODIMENTS

Figure 1:
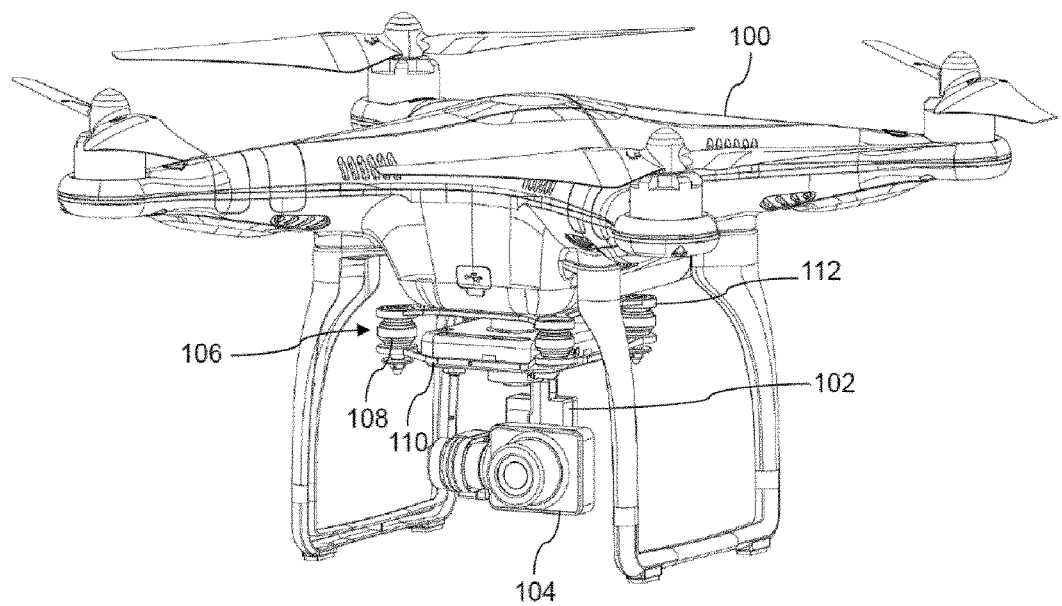
FIG. 1 illustrates a movable object, carrier, and payload, in accordance with embodiments.

The present disclosure provides improved systems, methods, and devices for controlling a payload. In some embodiments, a payload is coupled to another device (e.g., a movable object such as a UAV) using a carrier that controls the position and/or orientation (attitude) of the payload. For instance, an instruction regarding a desired movement of the payload can be received (e.g., from a user and/or from a processor onboard the movable object) and a corresponding movement of the carrier to achieve the desired movement of the payload can be determined. Advantageously, the embodiments herein can account for external disturbances on the carrier as well as the specific motion characteristics of the carrier when determining the appropriate carrier movement, thus enhancing the robustness of the system to external disturbances and improving the accuracy of payload control.

As described herein, an external disturbance may include any movements, forces, and/or torques applied to the carrier and/or payload from a source external to the payload and carrier. For instance, external disturbances may be produced by the movable object connected to the payload and carrier, another movable object, environmental conditions (e.g., wind, precipitation), temperature changes, obstacles within the environment, or combinations thereof.

Although some embodiments herein are presented in the context of UAVs, it shall be understood that the present disclosure can be applied to other types of movable objects, such as ground vehicles. Examples of movable objects suitable for use with the systems, methods, and devices provided herein are described in further detail below.

The movable objects described herein can be operated completely autonomously (e.g., by a suitable computing system such as an onboard controller), semi-autonomously, or manually (e.g., by a human user). The movable object can receive commands from a suitable entity (e.g., human user or autonomous control system) and respond to such commands by performing one or more actions. For example, the movable object can be a UAV controlled to take off from the ground, move within the air (e.g., with up to three degrees of freedom in translation and up to three degrees of freedom in rotation), move to target location or to a sequence of target locations, hover within the air, land on the ground, and so on. As another example, the movable object can be controlled to move at a specified velocity and/or acceleration (e.g., with up to three degrees of freedom in translation and up to three degrees of freedom in rotation) or along a specified movement path. Furthermore, the commands can be used to control one or more components, such as the components described herein (e.g., sensors, actuators, propulsion units, payload, etc.). For instance, some commands can be used to control the position, orientation, and/or operation of a payload such as a camera.

In some embodiments, the movable object is configured to carry a payload. The payload can include one or more of passengers, cargo, equipment, instruments, and the like. The payload can be provided within a housing. The housing may be separate from a housing of the movable object, or be part of a housing for a movable object. Alternatively, the payload can be provided with a housing while the movable object does not have a housing. Alternatively, portions of the payload or the entire payload can be provided without a housing. The payload can be rigidly fixed relative to the movable object. Optionally, the payload can be movable relative to the movable object (e.g., translatable or rotatable relative to the movable object).

In some embodiments, the payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

In some embodiments, the movable object is coupled to a carrier for the payload. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can be a suitable mounting structure (e.g., a gimbal platform) capable of stabilizing and/or directing the movement of the payload. In some embodiments, the carrier can be adapted to control the state of the payload (e.g., position and/or orientation) relative to the movable object. The carrier can be rotatably coupled to the movable object (e.g., via a rotatable joint or connection) so as to rotate relative to the movable object about one or more rotational axes. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof. In some embodiments, some or all of the axes of movement are orthogonal axes, e.g., a roll, pitch, and yaw axis. For example, the carrier can be configured to permit movement of the payload about a roll, pitch, and/or yaw axis. In some embodiments, the carrier is a single-axis or multi-axis gimbal that permits movement of the payload about a roll, pitch, and/or yaw axis. In alternative embodiments, some or all of the axes of movement may be non-orthogonal axes.

In some embodiments, the carrier includes one or more frames that provide support to the payload, such as one, two, three, or more frames. For instance, the carrier can include a single frame that is coupled (e.g., rotatably coupled) to the movable object and the payload. The carrier can include a first frame that is coupled (e.g., rotatably coupled) to the payload and a second frame that is coupled (e.g., rotatably coupled) to the movable object, and the first and second frames can be coupled (e.g., rotatably coupled) to each other, such that the payload is serially coupled to the movable object by the first frame and second frame. The carrier can include a first frame that is coupled (e.g., rotatably coupled) to the payload, a second frame that is coupled (e.g., rotatably coupled) to the movable object, and a third frame coupling (e.g., rotatably coupling) the first and second frames, such that the payload is serially coupled to the movable object by the first, third, and second frames. In some embodiments, a frame coupled to the movable object may be referred to as an "outer" or "outermost" frame, a frame coupled to the payload may be referred to as an "inner" or "innermost" frame, and a frame that is not directly coupled to the movable object or the payload may be referred to as a "middle frame."

Some or all of the frames can be movable relative to one another, and the carrier can include one or more actuators (e.g., motors) that actuate movement of the individual carrier frames. For instance, an actuator can actuate rotation of a carrier frame by applying a torque to the carrier frame about an axis of rotation. The actuators can permit the movement of multiple frames simultaneously, or may be configured to permit the movement of a single frame at a time. The movement of the frames can produce a corresponding movement of the payload. For example, the actuators can actuate a rotation of one or more frames about one or more axes of rotation (e.g., roll axis, pitch axis, or yaw axis). The rotation of the one or more frames can cause a payload to rotate about one or more axes of rotation relative to the movable object. Alternatively or in combination, the carrier actuation assembly can actuate a translation of frames along one or more axes of translation, and thereby produce a translation of the payload along one or more corresponding axes relative to the movable object. In some embodiments, the carrier includes one or more of: a yaw frame and a yaw actuator coupled to the yaw frame so as to actuate rotation of the yaw frame about a yaw axis; a roll frame and a roll actuator configured to actuate rotation of the roll frame about a roll axis; and/or a pitch frame and a pitch actuator configured to actuate rotation of the pitch frame about a pitch axis. In some embodiments, the carrier is coupled to the movable object via the yaw frame, while in other embodiments, the carrier can be coupled to the movable object via the pitch or roll frame.

In some embodiments, the carrier is directly coupled to the movable object. In other embodiments, the carrier is coupled to the movable object via a damping element. The damping element can be any element suitable for damping motion of the carrier and/or payload, such as an active damping element, a passive damping element, or a hybrid damping element having both active and passive damping characteristics. The damping element can be configured to reduce unwanted motions (e.g., vibrations, external disturbances) of the carrier and/or payload. The motion damped by the damping elements provided herein can include one or more of vibrations, oscillations, shaking, or impacts. Such motions may result from movement of the movable object, environmental conditions (e.g., wind, snow, rain), and/or collisions with other objects, for example. Such motions may originate from motions of the movable object that are transmitted to the payload via the carrier. The damping element may provide motion damping by isolating the carrier and/or payload from the source of unwanted motion by dissipating or reducing the amount of motion transmitted to carrier and/or payload (e.g., vibration isolation). The damping element may reduce the magnitude (e.g., amplitude) of the motion that would otherwise be experienced by the carrier and/or payload, such as by greater than or equal to approximately 10%, 20%, 30%, 40%, 50%, 60%, 70%, 80%, 90%, or 100%. In some instances, the damping element can be configured to reduce motions having certain frequencies. For example, some damping elements can reduce high frequency motions, while other damping elements can reduce low frequency motions. A damping element can damp motions having frequencies greater than or equal to about 0.5 Hz, 1 Hz, 5 Hz, 10 Hz, 20 Hz, 30 Hz, 40 Hz, 50 Hz, 100 Hz, 200 Hz, 300 Hz, 400 Hz, 500 Hz, 600 Hz, 700 Hz, 800 Hz, 900 Hz, or 1000 Hz. Alternatively, a damping element damp motions having frequencies less than or equal to about 0.5 Hz, 1 Hz, 5 Hz, 10 Hz, 20 Hz, 30 Hz, 40 Hz, 50 Hz, 100 Hz, 200 Hz, 300 Hz, 400 Hz, 500 Hz, 600 Hz, 700 Hz, 800 Hz, 900 Hz, or 1000 Hz.

The damping elements described herein can be formed from any suitable material or combination of materials, including solid, liquid, or gaseous materials. The materials used for the damping elements may be compressible and/or deformable. For example, the damping element can be a sponge, foam, rubber material, gel, and the like. Alternatively or in addition, the damping element can include piezoelectric materials or shape memory materials. The damping element can include one or more mechanical elements, such as springs, pistons, hydraulics, pneumatics, dashpots, shock absorbers, isolators, and the like. The properties of the damping element can be selected so as to provide a predetermined amount of motion damping. For example, the damping element may have a characteristic stiffness, which may correspond to a Young's modulus of the damping element. The Young's modulus may be greater than or equal to approximately 0.01 GPa, 0.05 GPa, 0.1 GPa, 0.2 GPa, 0.3 GPa, 0.4 GPa, 0.5 GPa, 0.6 GPa, 0.7 GPa, 0.8 GPa, 0.9 GPa, 1 GPa, or 5 GPa. Alternatively, the Young's modulus may be less than or equal to approximately 0.01 GPa, 0.05 GPa, 0.1 GPa, 0.2 GPa, 0.3 GPa, 0.4 GPa, 0.5 GPa, 0.6 GPa, 0.7 GPa, 0.8 GPa, 0.9 GPa, 1 GPa, or 5 GPa. In some instances, the damping element may have viscoelastic properties. The properties of the damping element may be isotropic or anisotropic. For instance, the damping element may provide motion damping equally along all directions of motion. Conversely, the damping element may provide motion damping only along a subset of the directions of motion (e.g., along a single direction of motion).

FIG. 1 illustrates a movable object 100, carrier 102, and payload 104, in accordance with embodiments. Although the movable object 100 is depicted as a UAV and the payload 104 is depicted as an imaging device, it shall be understood that other types of movable objects and payloads can be used in alternative embodiments. Additionally, although the carrier 102 and payload 104 are depicted as being located underneath the movable object 100, it shall be appreciated that other locations for the carrier 102 and payload 104 are also possible, e.g., above or to the side of the movable object 100.

In the embodiment of FIG. 1, the movable object 100 supports the carrier 102 and payload 104, and the carrier 102 is used to control the movement of the payload 104 relative to the movable object 100 (e.g., rotation about a roll, pitch, and/or yaw axis). The carrier 102 can be electrically coupled to one or more components of the movable object 100 (e.g., a processor within the movable object 100) so as to receive instructions for the movement of the carrier 102 or components thereof and/or transmit data regarding the current state (e.g., position and/or orientation) of the carrier 102 or components thereof. Optionally, the payload 104 can be electrically coupled to one or more components of the movable object 100 (e.g., a processor within the movable object 100) so as to receive instructions for the operation of the payload 104 or components thereof, transmit data regarding the current state (e.g., position, orientation, operating state, etc.) of the payload 104 or components thereof, and/or transmit data generated by the payload 104 (e.g., image data generated an the imaging device). The payload 104 can be electrically coupled to the movable object 100 via electrical connections coupled to or contained within the carrier 102, or can be electrically coupled to the movable object 100 independently of the carrier 102 (e.g., via wireless communication).

Optionally, the carrier 102 can be coupled to the movable object 100 via a damping element 106. In the depicted embodiment, the damping element 106 includes a plurality of rubber damping balls 108 (e.g., four rubber damping balls). However, it shall be appreciated that other types of damping elements can also be used in combination with or alternatively to the damping element 106. The carrier 102 can be coupled to the damping element 106 via a first coupling structure 110, depicted herein as a rigid plate, while the movable object 100 is coupled to the damping element 106 via a second coupling structure 112, also depicted as a rigid plate. Thus, it can be seen that the damping balls 108 can reduce the amount of motion transmitted from the movable object 100 to the carrier 102 and payload 104.

Figure 2:
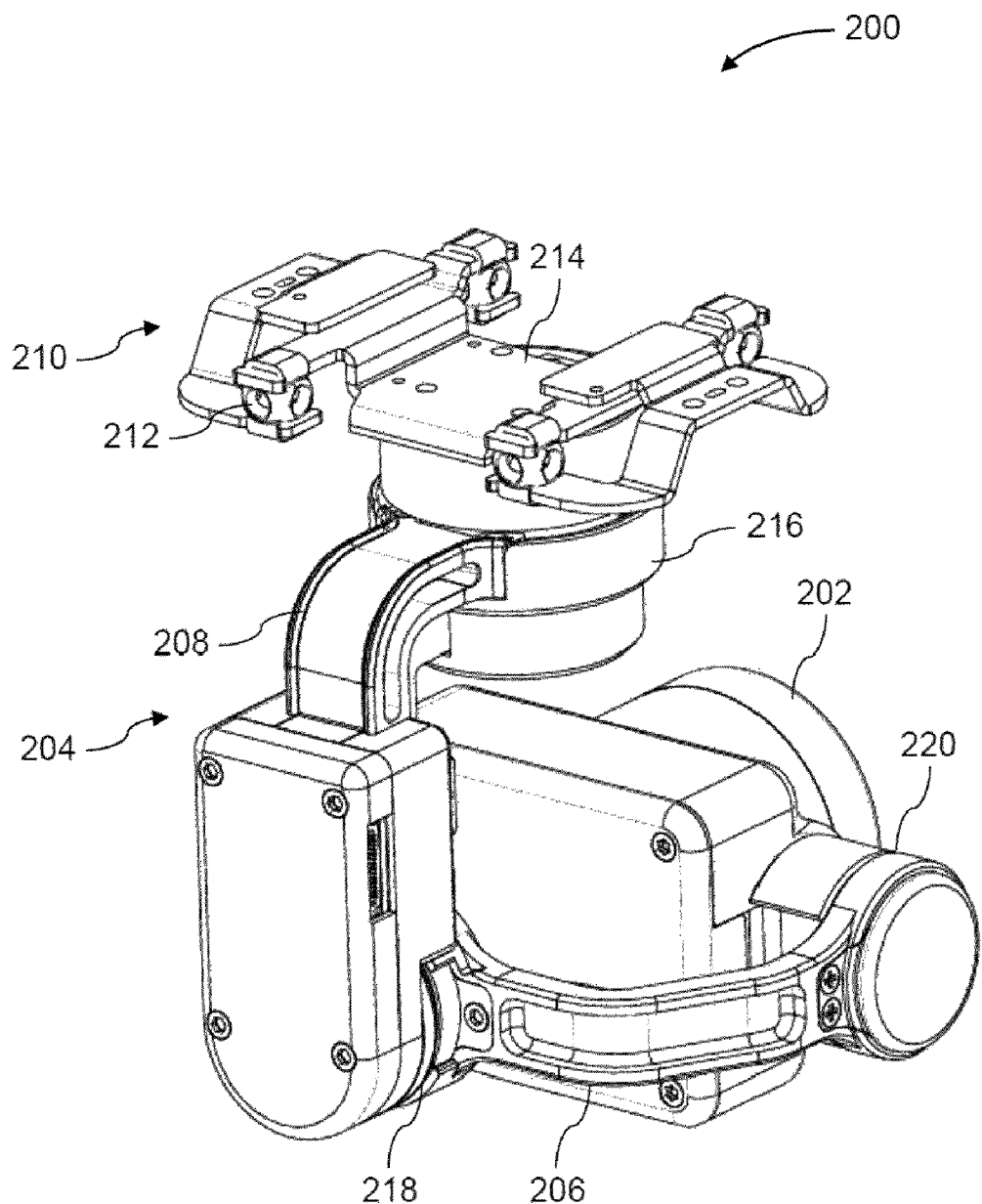
FIG. 2 illustrates an apparatus for controlling a payload, in accordance with embodiments.

FIG. 2 illustrates an apparatus 200 for controlling a payload 202 (e.g., an imaging device), in accordance with embodiments. The elements of the apparatus 200 can be used in combination with any of the systems, devices, and methods described herein. The apparatus 200 can be carried by a movable object (not shown), such as a UAV. The apparatus 200 includes a carrier 204 which is coupled to the payload 202. In the depicted embodiment, the carrier 204 includes a first frame 206 affixed to the payload 202 and a second frame 208 coupled to the first frame 206. The second frame 208 can be coupled to the movable object via a damping element 210. The damping element 210 can include a plurality of rubber damping balls 212 (e.g., four rubber damping balls), and the carrier 204 can be coupled to the damping element 210 via a coupling structure 214 (e.g., a plate). The damping element 210 can be configured to absorb and/or reduce vibrations transmitted to the carrier 204 and payload 202 from the movable object.

In the depicted embodiment, the second frame 208 is a yaw frame that is actuated by a yaw actuator 216 in order to rotate the carrier 204 and coupled payload 202 about a yaw axis, and the first frame 206 is a roll frame that is actuated by a roll actuator 218 in order to rotate the carrier 204 and coupled payload 202 about a roll axis. The carrier 204 can also include a pitch actuator 220 configured to rotate the payload 202 about a pitch axis. The actuators 216, 218, and 220 can each apply a torque to rotate the respective frame or payload about the corresponding axis of rotation. Each actuator can be a motor including a rotor and a stator. For instance, the yaw actuator 216 can include a rotor coupled to the yaw frame (second frame 208) and a stator coupled to the movable object (not shown), or vice-versa. However, it shall be appreciated that alternative configurations of the carrier can also be used (e.g., less than or more than two frames, the second frame 208 may be a pitch frame or a roll frame rather than a yaw frame, the first frame may be a yaw frame or a pitch frame rather than a roll frame, a separate pitch frame can be provided to coupled rotate the payload about a pitch axis, etc.).

As discussed above and herein, the carrier can be used to control the spatial disposition (e.g., position and/or orientation) of a coupled payload. For instance, the carrier can be used to move (e.g., translate and/or rotate) the payload to a desired spatial disposition. The desired spatial disposition can be manually input by a user (e.g., via remote terminal or other external device in communication with the movable object, carrier, and/or payload), determined autonomously without requiring user input (e.g., by one or more processors of the movable object, carrier, and/or payload), or determined semi-autonomously with aid of one or more processors of the movable object, carrier, and/or payload. The desired spatial disposition can be used to calculate a movement of the carrier or one or more components thereof (e.g., one or more frames) that would achieve the desired spatial disposition of the payload.

For example, in some embodiments, an input angle (e.g., a yaw angle) associated with a desired attitude of the payload is received by one or more processors (e.g., of the movable object, carrier, and/or payload). Based on the input angle, the one or more processors can determine an output torque to be applied to the carrier or one or more components thereof (e.g., a yaw frame) in order to achieve the desired attitude. The output torque can be determined in a variety of ways, such as using a feedback control loop. The feedback control loop can take the input angle as an input and output the output torque as an output. The feedback control loop can be implemented using one or more of a proportional (P) controller, a proportional-derivative (PD) controller, a proportional-integral (PI) controller, a proportional-integral-derivative (PID) controller, or combinations thereof.

Figure 3:
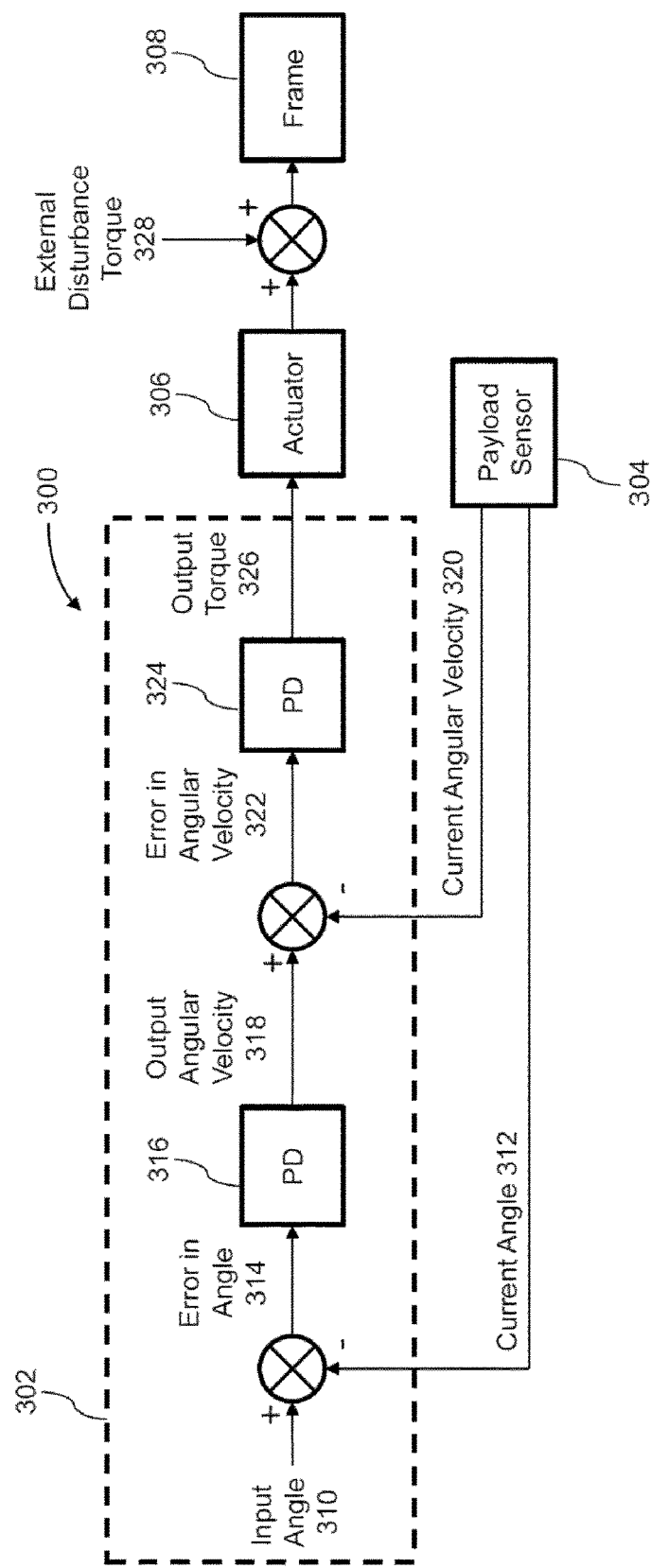
FIG. 3 illustrates a block diagram of a feedback loop for controlling a payload, in accordance with embodiments.

FIG. 3 illustrates a block diagram of a feedback control loop 300 for controlling an attitude of a payload, in accordance with embodiments. The feedback loop 300 can include a processor 302 (e.g., a digital signal processor (DSP)), a payload sensor 304, an actuator 306 (e.g., a motor), and a frame 308. The processor 302 can be located on the movable object, carrier, or payload. Alternatively, rather than using a single processor 302, multiple processors can be used, each of which is independently located on the movable object, carrier, or payload. The frame 308 can be an outer frame of a carrier that is coupled to a movable object, such as a yaw frame, and the actuator 306 can be coupled to the frame 308 in order to rotate the frame 308 about an axis, such as a yaw axis.

The payload sensor(s) 304 can be any sensor suitable for obtaining data indicative of a spatial disposition (e.g., position, orientation, angle) and/or motion characteristic (e.g., translational (linear) velocity, angular velocity, translational (linear) acceleration, angular acceleration) of a payload, such as an inertial sensor. An inertial sensor may be used herein to refer a motion sensor (e.g., a velocity sensor, an acceleration sensor such as an accelerometer), an orientation sensor (e.g., a gyroscope, inclinometer), or an IMU having one or more integrated motion sensors and/or one or more integrated orientation sensors. An inertial sensor may provide sensing data relative to a single axis of motion. The axis of motion may correspond to an axis of the inertial sensor (e.g., a longitudinal axis). A plurality of inertial sensors can be used, with each inertial sensor providing measurements along a different axis of motion. For example, three accelerometers can be used to provide acceleration data along three different axes of motion. The three directions of motion may be orthogonal axes. One or more of the accelerometers may be linear accelerometers configured to measure acceleration along a translational axis. Conversely, one or more of the accelerometers may be angular accelerometers configured to measure angular acceleration around a rotational axis. As another example, three gyroscopes can be used to provide orientation data about three different axes of rotation. The three axes of rotation may be orthogonal axes (e.g., roll axis, pitch axis, yaw axis). Alternatively, at least some or all of the inertial sensors may provide measurement relative to the same axes of motion. Such redundancy may be implemented, for instance, to improve measurement accuracy. Optionally, a single inertial sensor may be capable of providing sensing data relative to a plurality of axes. For example, an IMU including a plurality of accelerometers and gyroscopes can be used to generate acceleration data and orientation data with respect to up to six axes of motion. Alternatively, a single accelerometer can be used to detect acceleration along multiple axes, and a single gyroscope can be used to detect rotation about multiple axes.

The payload sensor(s) 304 can be carried by the payload. The payload sensor can be situated on any suitable portion of the payload, such as above, underneath, on the side(s) of, or within a body of the payload. In some embodiments, one or more sensors can be enclosed within a housing of the payload, positioned outside the housing, coupled to a surface (e.g., inner or outer surface) of the housing, or can form part of the housing. Some sensors can be mechanically coupled to the payload such that the spatial disposition and/or motion of the payload correspond to the spatial disposition and/or motion of the sensors. The sensor can be coupled to the payload via a rigid coupling, such that the sensor does not move relative to the portion of the payload to which it is attached. Alternatively, the coupling between the sensor and the payload can permit movement of the sensor relative to the payload. The coupling can be a permanent coupling or non-permanent (e.g., releasable) coupling. Suitable coupling methods can include adhesives, bonding, welding, and/or fasteners (e.g., screws, nails, pins, etc.). In some embodiments, the coupling between the sensor and the payload comprises shock absorbers or dampers that reduce vibrations or other undesirable mechanical movements from being transmitted from the payload body to the sensor. Optionally, the sensor can be integrally formed with a portion of the payload. Furthermore, the sensor can be electrically coupled with a portion of the payload (e.g., processing unit, control system, data storage). In alternative embodiments, the payload sensor(s) 304 may not necessarily be directly coupled to the payload, but may be connected to another component that is directly coupled to the payload (e.g., an inner frame directly coupled to the payload).

The processor 302 can receive an input angle 310 associated with a desired attitude of the payload (e.g., a yaw angle). For instance, the input angle 310 can be an angle of the frame 308 that would achieve the desired attitude of the payload. The processor 302 can also receive a current angle 312 associated with a current or instantaneous attitude of the payload from one or more payload sensors 304. The current angle 312 can be a current angle of the frame 308 corresponding to the current attitude of the payload. In some embodiments, the one or more payload sensors 304 output data indicative of an angle of the payload, and the current angle 312 of the frame 308 can be calculated based on the angle of the payload and/or information regarding the angles of other payload components (e.g., other carrier frames). Optionally, a rotation matrix can be used to convert the payload angle to the current angle 312.

The processor 302 can calculate the difference between the input angle 310 and the current angle 312, also referred to as the "error" in the angle 314. The error in the angle 314 can be input into a first PD controller 316. The first PD controller 316 can be implemented according to methods known to those of skill in the art. The first PD controller 316 can output an output angular velocity 318. The output angular velocity 318 can correspond to an angular velocity at which the frame 308 should be rotated in order to achieve the desired attitude of the payload.

The processor 302 can calculate the difference between the output angular velocity 318 and a current angular velocity 320 received from the payload sensor(s) 304, also known as the "error" in the angular velocity 322. The current angular velocity 320 can be associated with a current or instantaneous angular velocity of the payload. For instance, the current angular velocity 320 can be a current angle of the frame 308 corresponding to the current angular velocity of the payload. In some embodiments, the one or more payload sensors 304 output data indicative of an angular velocity of the payload, and the current angular velocity 320 of the frame 308 can be calculated based on the angular velocity of the payload and/or information regarding the angular velocities of other payload components (e.g., other carrier frames). Optionally, a rotation matrix can be used to convert the payload angular velocity to the current angular velocity 320.

The error in the angular velocity 322 can be input into a second PD controller 324. The second PD controller 324 can be implemented according to methods known to those of skill in the art. The second PD controller 324 can output an output torque 326. The output torque 326 can correspond to a torque which should be applied to the frame 308 in order to achieve the desired attitude of the payload. The processor 302 can transmit instructions to the actuator 306 to cause the actuator 306 to apply the output torque 326 to the frame 308.

In some embodiments, an external disturbance to the carrier may result in a disturbance torque 328 being applied to the frame 308, such that the actual amount of torque applied to the frame 308 may be the sum of the output torque 326 applied by the actuator 306 and the disturbance torque 328. Thus, it can be seen that the additional disturbance torque 328 may cause the angle that is actually achieved by the frame 308 to be different from the input angle 310, which in turn may result in the actual attitude of the payload differing from the desired attitude. These discrepancies may be detrimental to accurate control of payload attitude.

In some embodiments, the systems, methods, and devices of the present disclosure address these issues by determining an estimated disturbance torque that would be applied to the carrier by an external disturbance, and adjusting the output torque to be applied to the carrier based on the estimated disturbance torque. The embodiments herein can utilize one or more external disturbance sensors directly or indirectly coupled to the carrier in order to obtain data indicative of the external disturbance experienced by the carrier, such as spatial disposition (e.g., position, orientation, angle) and/or motion characteristics of the carrier (e.g., translational velocity, angular velocity, translational acceleration, angular acceleration). The one or more sensors can include one or more inertial sensors. As previously discussed, an inertial sensor may include a motion sensor (e.g., a velocity sensor, an acceleration sensor such as an accelerometer), an orientation sensor (e.g., a gyroscope, inclinometer), or an IMU having one or more integrated motion sensors and/or one or more integrated orientation sensors.

In some embodiments, the external disturbance sensor(s) are located on the carrier. The sensor(s) can be situated on any suitable portion of the carrier, such as above, underneath, on the side(s) of, or within a portion of the carrier. In some embodiments, one or more sensors can be enclosed within a frame of the carrier, positioned outside the frame, coupled to a surface (e.g., inner or outer surface) of the frame, or can form part of the frame. In some embodiments, one or more sensors can be enclosed within an actuator of the carrier, positioned outside the actuator, coupled to a surface (e.g., inner or outer surface) of the actuator, or can form part of the actuator. In some embodiments, one or more sensors are located on the carrier along an axis of rotation of the carrier. For instance, a sensor may be coupled to a yaw frame or a yaw actuator at a location along the yaw axis of the yaw frame.

Some sensors can be mechanically coupled to the carrier such that the spatial disposition and/or motion of the carrier correspond to the spatial disposition and/or motion of the sensors. The sensor can be coupled to the carrier via a rigid coupling, such that the sensor does not move relative to the portion of the carrier to which it is attached. Alternatively, the coupling between the sensor and the carrier can permit movement of the sensor relative to the carrier. The coupling can be a permanent coupling or non-permanent (e.g., releasable) coupling. Suitable coupling methods can include adhesives, bonding, welding, and/or fasteners (e.g., screws, nails, pins, etc.). In some embodiments, the coupling between the sensor and the carrier comprises shock absorbers or dampers that reduce vibrations or other undesirable mechanical movements from being transmitted from the carrier to the sensor. Optionally, the sensor can be integrally formed with a portion of the carrier. Furthermore, the sensor can be electrically coupled with a portion of the carrier (e.g., processing unit, control system, data storage).

In alternative embodiments, the sensor(s) may not necessarily be directly coupled to the carrier, but may be connected to another component that is directly coupled to the carrier, such as a damping element or a coupling structure connecting the carrier to the damping element. As discussed above and herein, the damping element may be interposed between the carrier and a movable object so as to reduce transmission of unwanted motions from the movable object to the carrier. A coupling structure may be used to connect the carrier or a portion thereof (e.g., a frame of the carrier) to the damping element. The one or more sensors can be located on the damping element and/or coupling structure so as to provide data regarding any external disturbances experienced by the carrier.

The sensor data obtained by the external disturbance sensor(s) can be processed in order to estimate the amount of external disturbance torque. In some embodiments, the sensor data is input into a dynamic model of carrier and/or payload, and the output of the model is the estimated external disturbance torque. The dynamic model can include parameters corresponding to the specific characteristics of the particular carrier and/or payload. The determination of model parameters and generation of the dynamic model can be determined according to methods known to those of skill in the art. The dynamic model can be determined prior to operation and can be pre-stored in memory located on the payload, carrier, and/or movable object.

In some embodiments, for a three-axis carrier or gimbal, the mathematical model for the relation between the external disturbance torque on the outer frame (e.g., the yaw frame) and the acceleration of the damping element connecting the carrier to the movable object is:

$$T_{disturb} = (K_1 \sin(\Psi) + K_2 \cos(\theta)\cos(\Psi))a_x + (K_3 \cos(\Psi) + K_4 \cos(\theta)\sin(\Psi))a_y$$

where: $T_{disturb}$ is an estimation of the amount of disturbance torque on the actuator of the outer frame (e.g., the yaw actuator); $K_1$, $K_2$, $K_3$, and $K_4$ are parameters of the dynamic model, which are determined based on the weight, rotational inertial tensor, and geometry of the three carrier frames; $a_x$ and $a_y$ are the acceleration measurements of damping element in x and y directions, respectively; and $\Psi$, $\theta$ are the current joint angles as measured by sensors (e.g., potentiometers) coupled to the actuators of the carrier frames (e.g., $\Psi$ is the angle of the yaw actuator of the yaw frame, and $\theta$ is the angle of the roll actuator of the roll frame).

Figure 4:
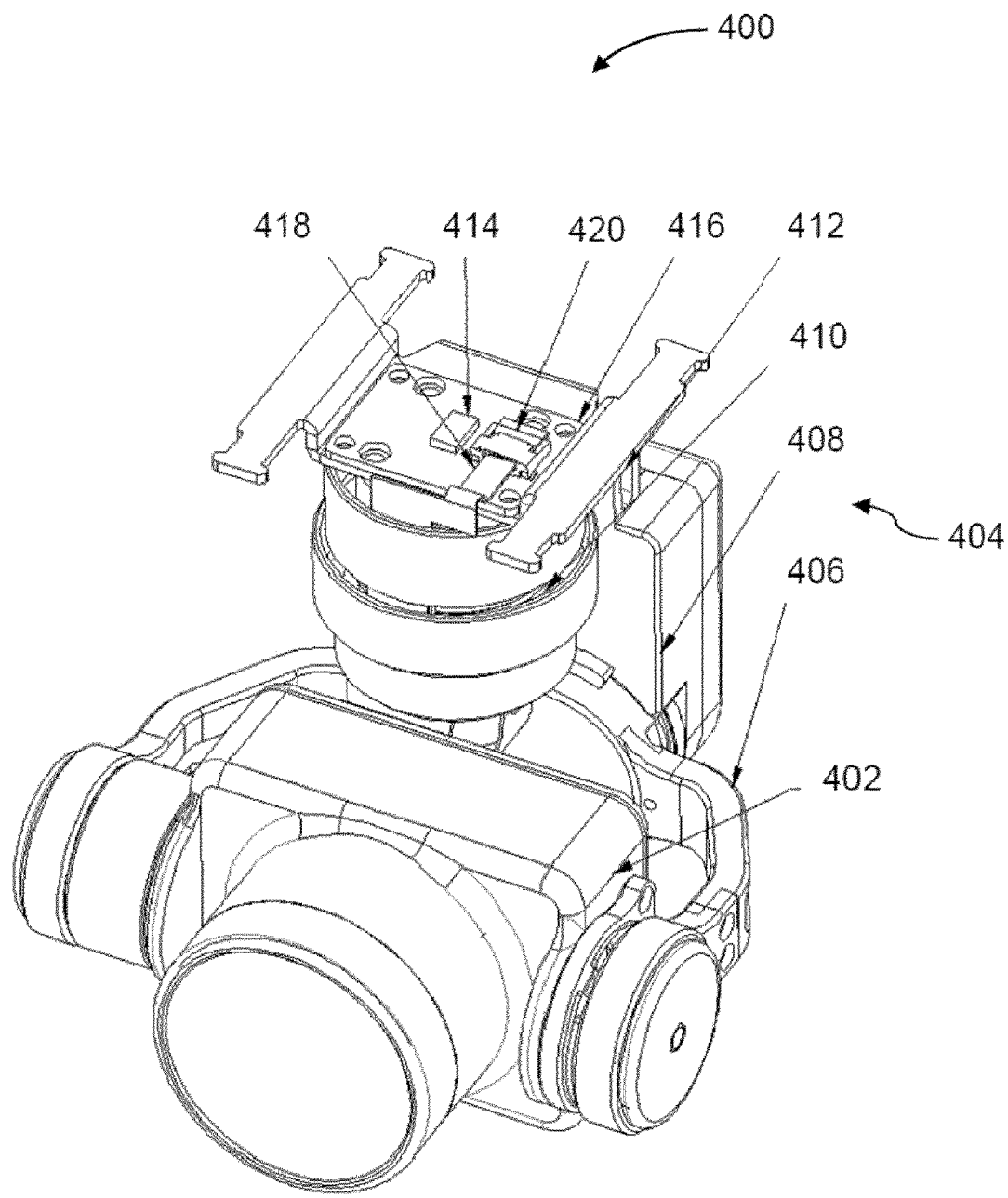
FIG. 4 illustrates an apparatus for controlling a payload, in accordance with embodiments.

FIG. 4 illustrates an apparatus 400 for controlling a payload 402 (e.g., an imaging device) in accordance with embodiments. The elements of the apparatus 400 can be used in combination with any of the systems, devices, and methods described herein. The apparatus 400 can be carried by a movable object (not shown), such as a UAV. Similar to the apparatus 200 of FIG. 2, the apparatus 400 includes a carrier 404 coupled to the payload 402, the carrier 404 including a first frame 406 affixed to the payload 402 and a second frame 408 coupled to the first frame 406. In the depicted embodiment, the second frame 408 is actuated by an actuator 410 in order to rotate the carrier 404 and coupled payload 402 about an axis of rotation (e.g., a yaw axis). The actuator 410 can apply a torque to rotate the frame about the corresponding axis of rotation. The second frame 408 can be coupled to the movable object via a damping element (not shown), such as a plurality of rubber damping balls. The carrier 404 can be coupled to the damping element via a coupling structure 412 (e.g., a plate).

The apparatus 400 can include one or more external disturbance sensors 414 coupled directly or indirectly to the second frame 408. The external disturbance sensor(s) 414 can be one or more accelerometers, one or more gyroscopes, or an IMU with one or more accelerometers and one or more gyroscopes. In the depicted embodiment, the external disturbance sensor(s) 414 are located on the coupling structure 412 connecting the second frame 408 to the damping element, such as on a printed circuit board (PCB) or flexible printed circuit (FPC) 416 attached onto the coupling structure 412. The sensor data is transmitted to one or more processors (e.g., a DSP) via a FPC cable 418 and a FPC cable connector 420. In some embodiments, the one or more processors are located in the payload 402 and the FPC cable 418 extends through the first frame 406 and second frame 408. In alternative embodiments, the one or more processors may be located elsewhere (e.g., on the carrier 404 or movable object) and the FPC cable 418 can be routed appropriately.

In alternative embodiments, the external disturbance sensor(s) 414 can be located on other portions of the apparatus 400, such as on the carrier 404. For example, one or more external disturbance sensor(s) 414 can be positioned on or in proximity to the second frame 408. Alternatively or in combination, one or more external disturbance sensor(s) 414 can be positioned on or in proximity to the actuator 410. In embodiments where the sensor(s) 414 are located on the second frame 408, the sensor data from the sensor(s) 414 can be converted from the reference frame of the second frame 408 to the reference frame of the coupling structure 412, e.g., using a single rotation matrix transformation.

In some embodiments, the one or more external disturbance sensor(s) 414 are positioned so as to lie along the axis of rotation of the second frame 408 (e.g., a yaw axis). In the embodiment of FIG. 4, the external disturbance sensor(s) 414 is illustrated as being positioned on the coupling structure 412 at a location along the axis of rotation of the second frame 408. The sensor(s) 414 can also be positioned at other locations on the apparatus 400 that are along the axis of rotation of the second frame 408, such as underneath the actuator 410. In some embodiments, positioning the sensor(s) 414 along the axis of rotation of the second frame 408 can simplify the disturbance torque calculations described herein, since there may be no relative acceleration between the coupling structure 412 and actuator 410 in the horizontal direction.

Figure 5:
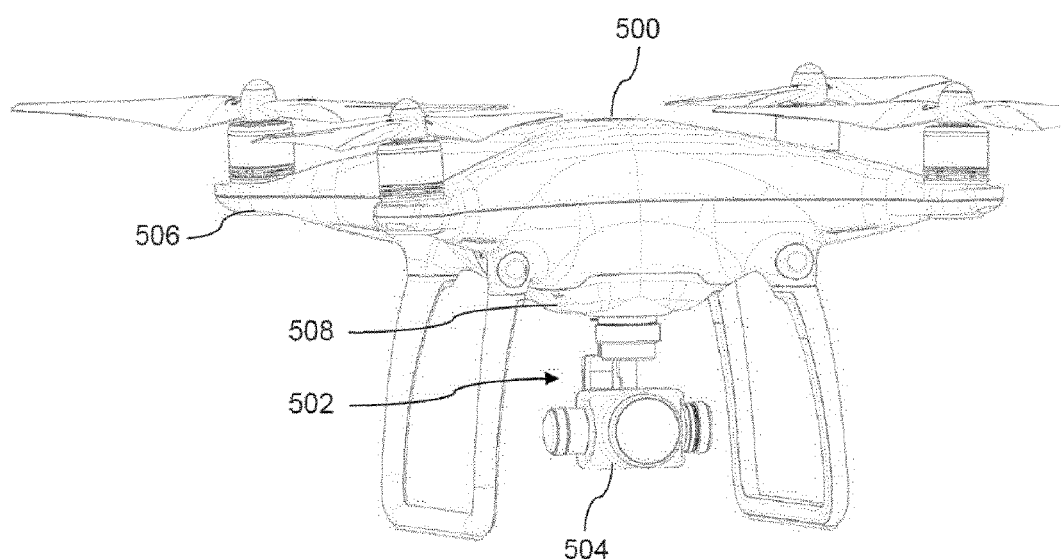
FIG. 5 illustrates a movable object, carrier, and payload, in accordance with embodiments.

FIG. 5 illustrates a movable object 500, carrier 502, and payload 504, in accordance with embodiments. Although the movable object 500 is depicted as a UAV and the payload 504 is depicted as an imaging device, it shall be understood that other types of movable objects and payloads can be used in alternative embodiments. Additionally, although the carrier 502 and payload 504 are depicted as being located underneath the movable object 500, it shall be appreciated that other locations for the carrier 502 and payload 504 are also possible, e.g., above or to the side of the movable object 500.

Similar to the embodiment of FIG. 1, the movable object 500 supports the carrier 502 and payload 504, and the carrier 502 is used to control the movement of the payload 504 relative to the movable object 500 (e.g., rotation about a roll, pitch, and/or yaw axis). The carrier 502 can be electrically coupled to one or more components of the movable object 500 (e.g., a processor within the movable object 500) so as to receive instructions for the movement of the carrier 502 or components thereof and/or transmit data regarding the current state (e.g., position and/or orientation) of the carrier 502 or components thereof. Optionally, the payload 504 can be electrically coupled to one or more components of the movable object 500 (e.g., a processor within the movable object 500) so as to receive instructions for the operation of the payload 504 or components thereof, transmit data regarding the current state (e.g., position, orientation, operating state, etc.) of the payload 504 or components thereof, and/or transmit data generated by the payload 504 (e.g., image data generated an the imaging device). The payload 504 can be electrically coupled to the movable object 500 via electrical connections coupled to or contained within the carrier 502, or can be electrically coupled to the movable object 500 independently of the carrier 502 (e.g., via wireless communication).

Optionally, the carrier 502 can be coupled to the movable object 500 via a damping element located within an external housing 506 of the movable object 500. For instance, the external housing 506 can define an interior cavity within the movable object 500, and the damping element can be located within the interior cavity. The carrier 502 can be coupled to the movable object 500 via a lower housing section 508.

Figure 6:
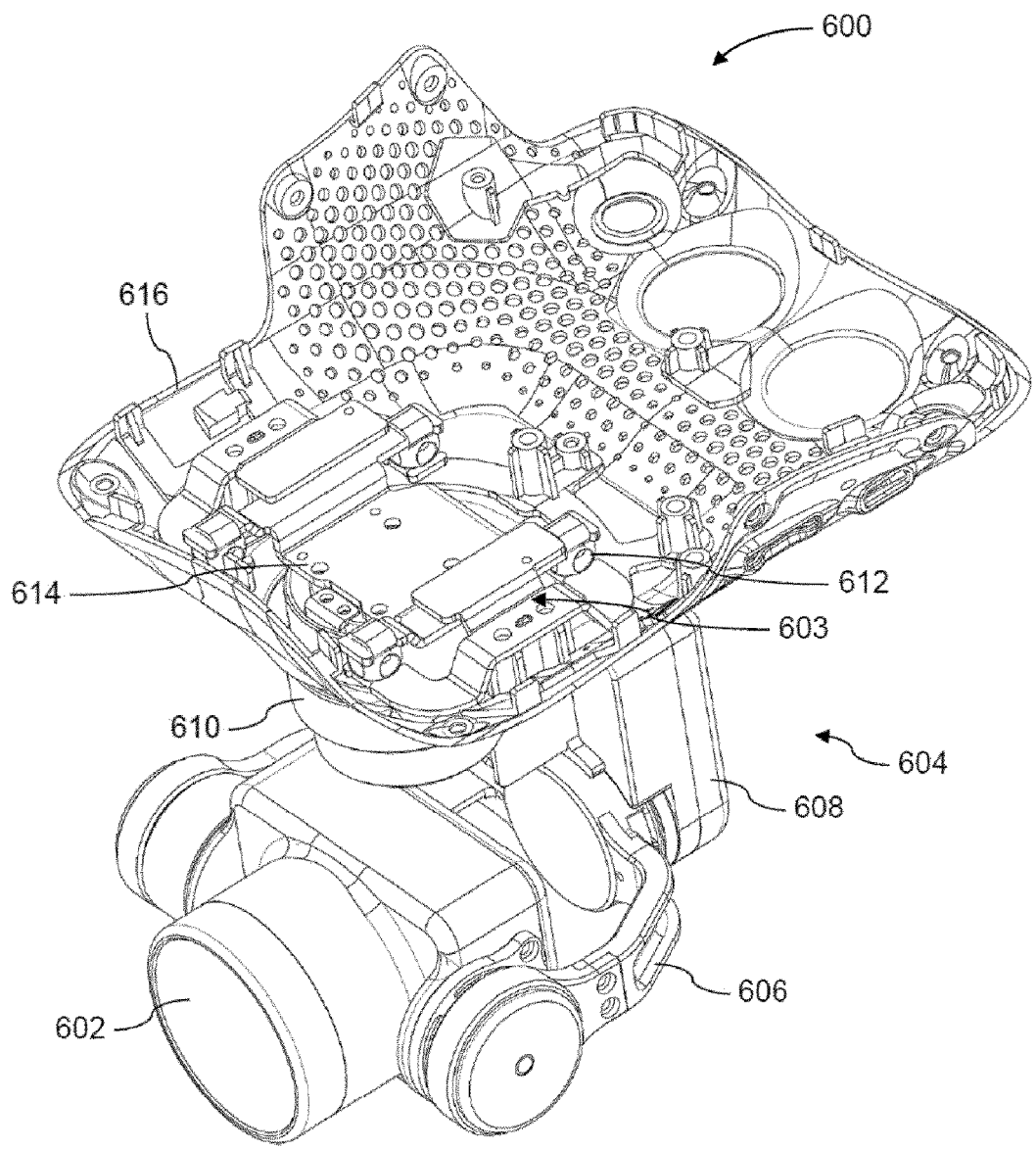
FIG. 6 illustrates an apparatus for controlling a payload including an internal damping element, in accordance with embodiments.

FIG. 6 illustrates an apparatus 600 for controlling a payload 602 including an internal damping element 603. The elements of the apparatus 600 can be used in combination with any of the systems, devices, and methods described herein. The apparatus 600 can be carried by a movable object (not shown), such as a UAV (e.g., the UAV 500 of FIG. 5). Similar to the apparatus 400 of FIG. 4, the apparatus 600 includes a carrier 604 coupled to the payload 602, the carrier 604 including a first frame 606 affixed to the payload 602, a second frame 608 coupled to the first frame 606, and an actuator 610 that applies torque to the second frame 608 in order to rotate the carrier 604 and coupled payload 602 about an axis of rotation (e.g., a yaw axis). The second frame 608 can be coupled to the movable object via a damping element 603 (not shown), shown here as a plurality of rubber damping balls 612. The carrier 604 can be coupled to the damping element 603 via a coupling structure 614 (e.g., a plate). The coupling structure 614 and damping element 603 can be located within an interior cavity defined by an external housing of the movable object. For instance, the external housing can include a lower housing section 616 and the coupling structure 614 and damping element 630 can be located within the interior cavity coupled to the lower housing section 616. The apparatus 600 can further include one or more external disturbance sensors coupled directly or indirectly to the second frame 608, e.g., attached to a PCB or FCB on the coupling structure 614 within the interior cavity of the movable object.

Figure 7:
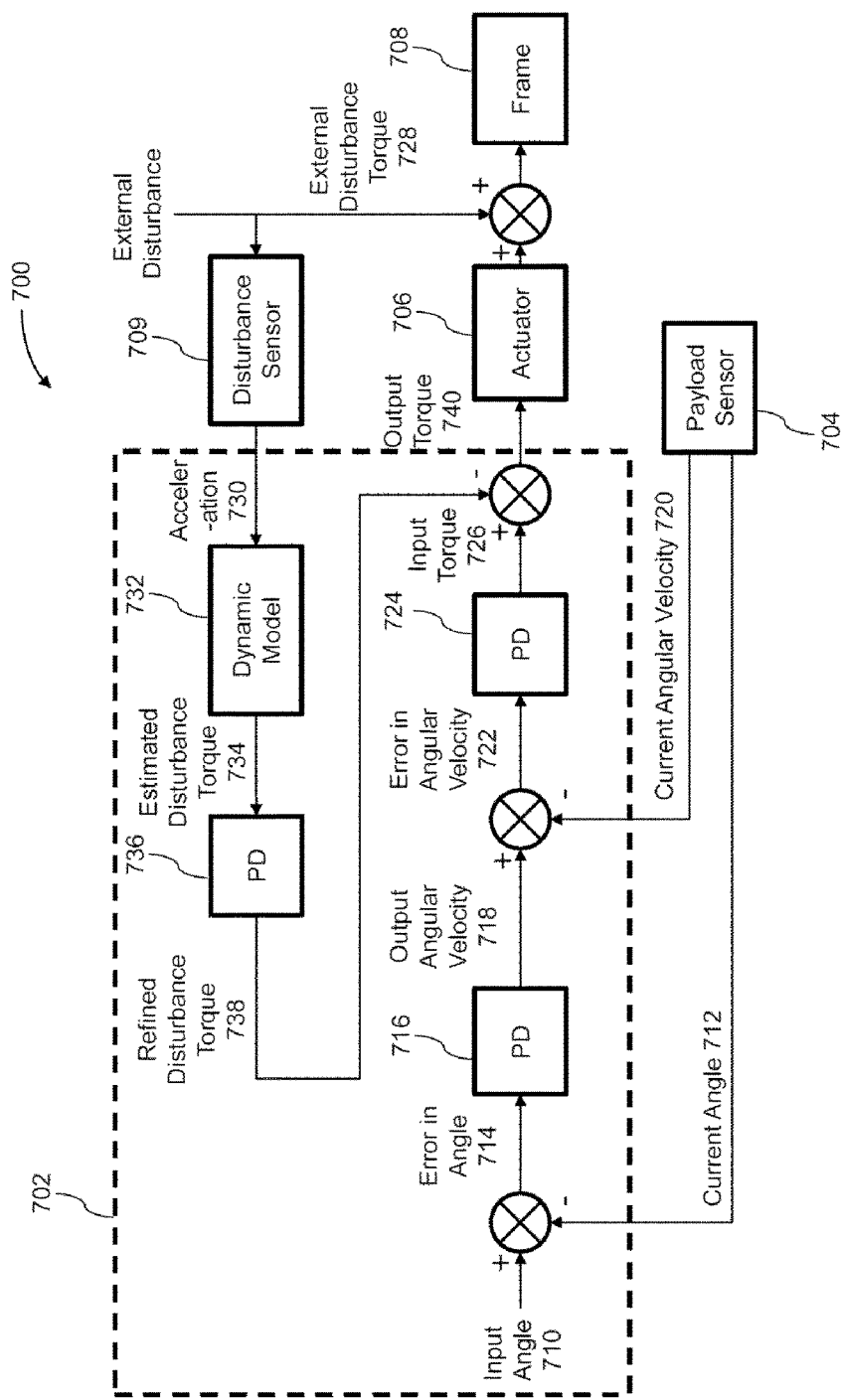
FIG. 7 illustrates a block diagram of a feedback loop for controlling a payload, in accordance with embodiments.

FIG. 7 illustrates a block diagram of a feedback control loop 700 for controlling an attitude of a payload, in accordance with embodiments. The feedback loop 700 can include a processor 702 (e.g., a digital signal processor (DSP)), a payload sensor 704, an actuator 706 (e.g., a motor), and a frame 708. The payload sensor 704, actuator 706, and frame 708 may be substantially similar to the elements of the feedback control loop 300 described above with respect to FIG. 3. The feedback loop 700 can further include one or more external disturbance sensors 709 configured to detect an external disturbance applied to the carrier and/or payload.

Similar to the processor 302 of FIG. 3, the processor 702 can receive an input angle 710 associated with a desired attitude of the payload (e.g., a yaw angle). For instance, the input angle 710 can be an angle of the frame 708 that would achieve the desired attitude of the payload. The processor 702 can also receive a current angle 712 associated with a current attitude of the payload from one or more payload sensors 704. The current angle 712 can be a current or instantaneous angle of the frame 708 corresponding to the current attitude of the payload. In some embodiments, the one or more payload sensors 704 output data indicative of an angle of the payload, and the current angle 712 of the frame 708 can be calculated based on the angle of the payload and/or information regarding the angles of other payload components (e.g., other carrier frames). Optionally, a rotation matrix can be used to convert the payload angle to the current angle 712.

The processor 702 can calculate the difference between the input angle 710 and the current angle 712, also referred to as the "error" in the angle 714. The error in the angle 714 can be input into a first PD controller 716. The first PD controller 716 can be implemented according to methods known to those of skill in the art. The first PD controller 716 can output an output angular velocity 718. The output angular velocity 718 can correspond to an angular velocity at which the frame 708 should be rotated in order to achieve the desired attitude of the payload.

The processor 702 can calculate the difference between the output angular velocity 718 and a current angular velocity 720 received from the payload sensor(s) 704, also known as the "error" in the angular velocity 722. The current angular velocity 720 can be associated with a current or instantaneous angular velocity of the payload. For instance, the current angular velocity 720 can be a current angle of the frame 708 corresponding to the current angular velocity of the payload. In some embodiments, the one or more payload sensors 704 output data indicative of an angular velocity of the payload, and the current angular velocity 720 of the frame 708 can be calculated based on the angular velocity of the payload and/or information regarding the angular velocities of other payload components (e.g., other carrier frames). Optionally, a rotation matrix can be used to convert the payload angular velocity to the current angular velocity 720.

The error in the angular velocity 722 can be input into a second PD controller 724. The second PD controller 724 can be implemented according to methods known to those of skill in the art. The second PD controller 724 can output an input torque 726.

In some embodiments, an external disturbance to the carrier may result in a disturbance torque 728 being applied to the frame 708. The external disturbance sensor(s) 709 can provide measurement data indicative of an acceleration 730 (e.g., translational and/or angular acceleration) of a damping element coupling the frame 708 to the movable object. The acceleration 730 can be input into a dynamic model 732 of the carrier implemented by the processor 702. As described above and herein, the dynamic model 732 can include pre-stored parameters corresponding to the particular characteristics of the carrier. The dynamic model 732 can output an estimated disturbance torque 734. The estimated disturbance torque 734 can represent an estimated torque that would be applied on the frame 708 as a result of the external disturbance. Optionally, the estimated disturbance torque 734 can be input into a third PD controller 736 of the processor 702 in order to produce a refined disturbance torque 738.

The processor 702 can calculate the difference between the input torque 726 and refined disturbance torque 738 (or estimated disturbance torque 734) in order to obtain an output torque 740. The output torque 740 can correspond to a torque which should be applied to the frame 708 in order to achieve the desired attitude of the payload even when an external disturbance resulting in external disturbance torque 728 is present. The processor 702 can transmit instructions to the actuator 706 to cause the actuator 706 to apply the output torque 740 to the frame 708.

Figure 8:
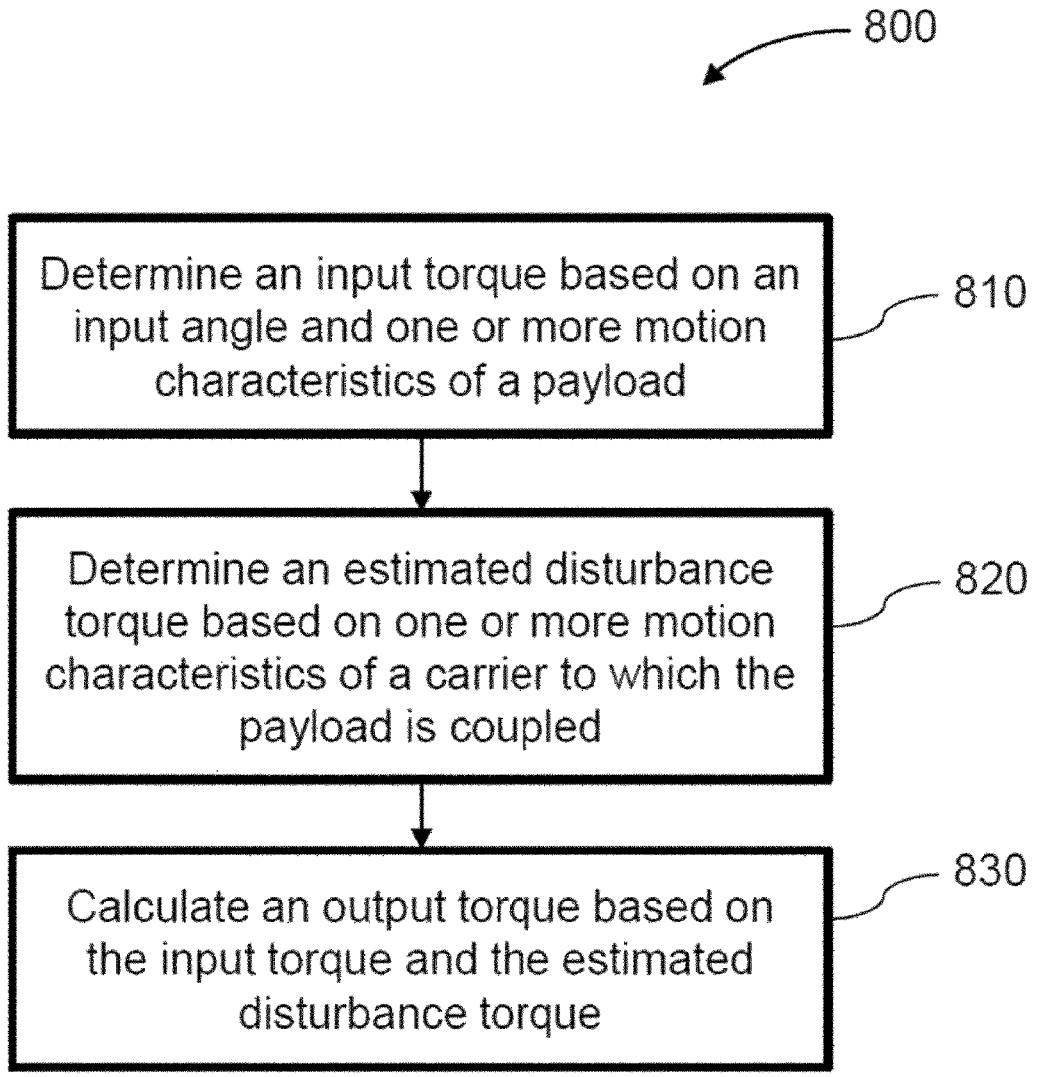
FIG. 8 illustrates a method for controlling a payload, in accordance with embodiments.

FIG. 8 illustrates a method 800 for controlling a payload, in accordance with embodiments. The method 800 can be performed using any embodiment of the systems and devices described herein. In some embodiments, the method 800 can be performed using one or more processors of a motion controller, e.g., located on a movable object, carrier, and/or payload. The motion controller can be configured to effect movement of the carrier to achieve a desired attitude of the payload.

In step 810, an input torque is determined based on an input angle and one or more motion characteristics of a payload. The input angle can be associated with a desired attitude of the payload. The input angle can be provided by a user using an external device in communication with the payload. The input angle can be provided to one or more processors of a motion controller, e.g., on the payload, carrier, or movable object. The motion characteristics of the payload can include a an instantaneous attitude, an instantaneous position, a linear velocity, an angular velocity, a linear acceleration, and/or an angular acceleration of the payload, and can be measured using one or more sensors located on or in proximity to the payload.

In some embodiments, the input torque is determined using a feedback control loop, such as the control loop depicted in FIG. 3 or FIG. 7. The feedback control loop can be implemented using at least one PD controller, e.g., a first PD controller configured to calculate an input angular velocity based on a difference between an instantaneous angle measured by one or more sensors on the payload and the input angle and/or a second PD controller configured to calculate the input torque based on a difference between an instantaneous angular velocity measured by the one or more sensors on the payload and the input angular velocity.

In step 820, an estimated disturbance torque is determined based on one or more motion characteristics of a carrier to which the payload is coupled. The estimated disturbance torque can be associated with a disturbance to the carrier. The disturbance can include one or more of wind effects, temperature changes, or external impact to the payload or carrier, for example. The motion characteristics of the carrier can include an instantaneous attitude, an instantaneous position, a linear velocity, an angular velocity, a linear acceleration, and/or an angular acceleration of the carrier. The estimated disturbance torque can be calculated with respect to a rotatable joint on a frame of the carrier (e.g., a yaw frame), the rotatable joint being configured to couple the frame to the movable object.

In some embodiments, the carrier includes a first and second frame as described herein, and the motion characteristics include at least a linear acceleration or an angular acceleration of the second frame. As discussed above and herein, the motion characteristics can be measured using one or more sensors (e.g., inertial sensors) located at any suitable location (e.g., on a frame of the carrier, such as on or in proximity to the second frame). In some embodiments, the sensors are configured to measure the motion characteristics of the carrier (e.g., a second frame of the carrier) when coupled to the movable object via a damping element, and the sensors can be directly disposed on a coupling structure connecting the damping element to the second frame. The estimated disturbance torque can be determined based on one or more motion characteristics of the carrier (e.g., linear acceleration or angular acceleration) measured using one or more sensors disposed on or in proximity to the carrier. Alternatively or in combination, the estimated disturbance torque can be determined based on one or more motion characteristics of the damping element (e.g., linear acceleration or angular acceleration) measured using one or more sensors disposed on the damping element. The motion characteristics of the damping element can be associated with the one or more motion characteristics of the carrier (e.g., a second frame of the carrier).

The estimated disturbance torque can be determined in various ways. In some embodiments, the estimated disturbance torque is determined by a rotation matrix transformation comprising measurements of the one or more motion characteristics of the carrier. Alternatively or in combination, the estimated disturbance torque is determined by inputting one or more motion characteristics of a damping element into a predefined dynamics-based model of the carrier. In some embodiments, the estimated disturbance torque is further refined using a PD controller, e.g., by applying one or more filters to the estimated disturbance torque.

In step 830, an output torque is calculated based on the input torque and the estimated disturbance torque e.g., by one or more processors of the motion controller. The output torque can be calculated by compensating the input torque with the estimated disturbance torque. For instance, the output torque can be calculated by subtracting the estimated disturbance torque from the input torque. In some embodiments, the output torque is calculated based on the input torque and the refined disturbance torque described above.

The output torque can be used to effect movement of the carrier to achieve the desired attitude of the payload. For instance, the motion controller can be configured to control an actuator that is coupled to the carrier to rotate at the output torque so as to effect the movement of the carrier to achieve the desired attitude of the payload. The actuator can be coupled to the second frame of the carrier, for example. In some embodiments, the output torque can be used in conjunction with an actual disturbance torque from the disturbance to effect the movement of the carrier so as to achieve the desired attitude of the payload. The actual disturbance torque may be applied to a frame of the carrier, for example.

The systems, devices, and methods described herein can be applied to a wide variety of movable objects. As previously mentioned, any description herein of an aerial vehicle may apply to and be used for any movable object. A movable object of the present disclosure can be configured to move within any suitable environment, such as in air (e.g., a fixed-wing, aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object s an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 9:
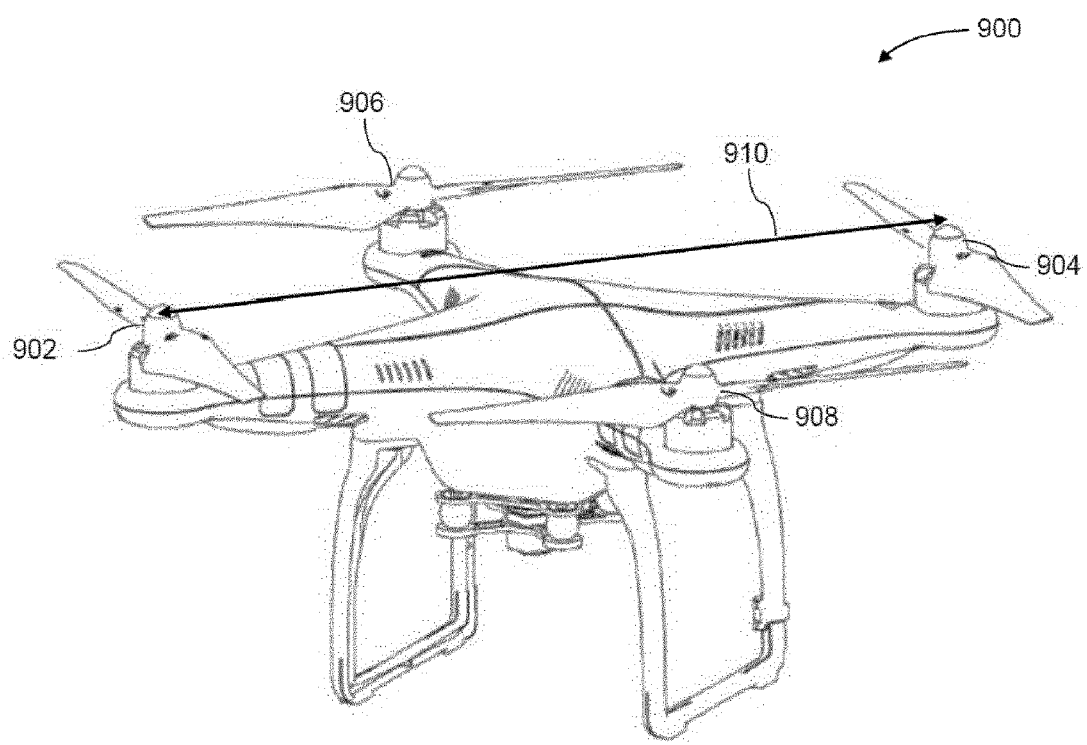
FIG. 9 illustrates an unmanned aerial vehicle, in accordance with embodiments.

FIG. 9 illustrates an unmanned aerial vehicle (UAV) 900, in accordance with embodiments of the present disclosure. The UAV may be an example of a movable object as described herein. The UAV 900 can include a propulsion system having four rotors 902, 904, 906, and 908. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 910. For example, the length 910 can be less than or equal to 2 m, or less than equal to 5 m. In some embodiments, the length 910 can be within a range from 40 cm to 1 m, from 10 cm to 2 m, or from 5 cm to 5 m. Any description herein of a UAV may apply to a movable object, such as a movable object of a different type, and vice versa.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal ma receive and/or display information from the movable object, carrier, and/or payload. For example, a first terminal may be used to control the positioning of the payload relative to an environment while a second terminal displays image data captured by the payload. Various communication nodes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 10:
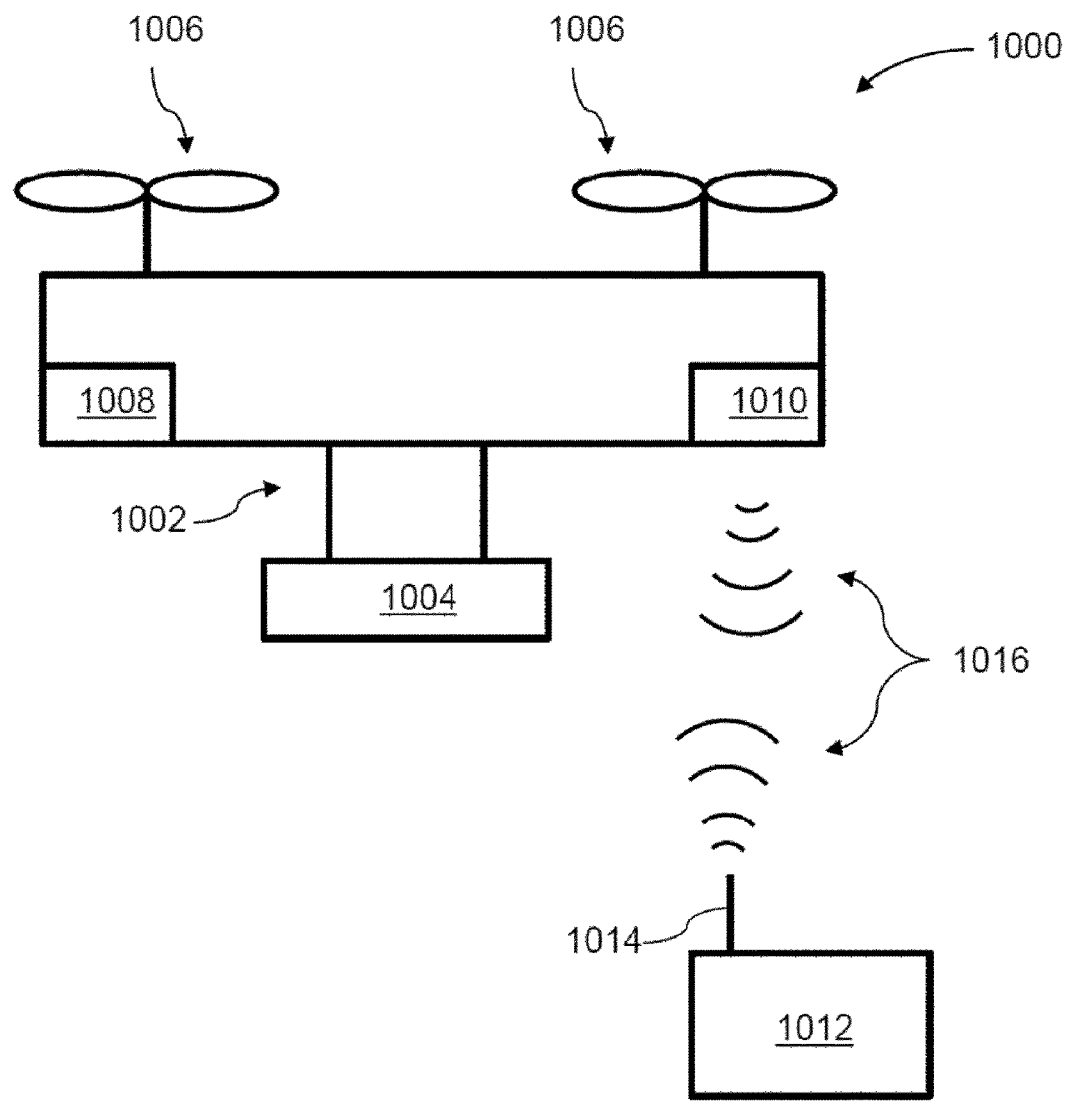
FIG. 10 illustrates a movable object including a carrier and a payload, in accordance with embodiments.

FIG. 10 illustrates a movable object 1000 including a carrier 1002 and a payload 1004, in accordance with embodiments. Although the movable object 1000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1004 may be provided on the movable object 1000 without requiring the carrier 1002. The movable object 1000 may include propulsion mechanisms 1006, a sensing system 1008, and a communication system 1010.

The propulsion mechanisms 1006 can include one or more of rotors, propellers, blades, engines, motors, wheels, axles, magnets, or nozzles, as previously described. For example, the propulsion mechanisms 1006 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1006 can be mounted on the movable object 1000 using any suitable means, such as a support element (e.g., a drive shaft) as described elsewhere herein. The propulsion mechanisms 1006 can be mounted on any suitable portion of the movable object 1000, such on the top, bottom, front, back, sides, or suitable combinations thereof.

In some embodiments, the propulsion mechanisms 1006 can enable the movable object 1000 to take off vertically from a surface or land vertically on a surface without requiring any horizontal movement of the movable object 1000 (e.g., without traveling down a runway). Optionally, the propulsion mechanisms 1006 can be operable to permit the movable object 1000 to hover in the air at a specified position and/or orientation. One or more of the propulsion mechanisms 1000 may be controlled independently of the other propulsion mechanisms. Alternatively, the propulsion mechanisms 1000 can be configured to be controlled simultaneously. For example, the movable object 1000 can have multiple horizontally oriented rotors that can provide lift and/or thrust to the movable object. The multiple horizontally oriented rotors can be actuated to provide vertical takeoff, vertical landing, and hovering capabilities to the movable object 1000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1000 (e.g., with respect to up to three degrees of translation and up to three degrees of rotation).

The sensing system 1008 can include one or more sensors that may sense the spatial disposition, velocity, and/or acceleration of the movable object 1000 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1008 can be used to control the spatial disposition, velocity, and/or orientation of the movable object 1000 (e.g., using a suitable processing unit and/or control module, as described below). Alternatively, the sensing system 1008 can be used to provide data regarding the environment surrounding the movable object, such as weather conditions, proximity to potential obstacles, location of geographical features, location of manmade structures, and the like.

The communication system 1010 enables communication with terminal 1012 having a communication system 1014 via wireless signals 1016. The communication systems 1010, 1014 may include any number of transmitters, receivers, and/or transceivers suitable for wireless communication. The communication may be one-way communication, such that data can be transmitted in only one direction. For example, one-way communication may involve only the movable object 1000 transmitting data to the terminal 1012, or vice-versa. The data may be transmitted from one or more transmitters of the communication system 1010 to one or more receivers of the communication system 1012, or vice-versa. Alternatively, the communication may be two-way communication, such that data can be transmitted in both directions between the movable object 1000 and the terminal 1012. The two-way communication can involve transmitting data from one or more transmitters of the communication system 1010 to one or more receivers of the communication system 1014, and vice-versa.

In some embodiments, the terminal 1012 can provide control data to one or more of the movable object 1000, carrier 1002, and payload 1004 and receive information from one or more of the movable object 1000, carrier 1002, and payload 1004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1006), or a movement of the payload with respect to the movable object (e.g., via control of the carrier 1002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1008 or of the payload 1004). The communications may include information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1012 can be configured to control a state of one or more of the movable object 1000, carrier 1002, or payload 1004. Alternatively or in combination, the carrier 1002 and payload 1004 can also each include a communication module configured to communicate with terminal 1012, such that the terminal can communicate with and control each of the movable object 1000, carrier 1002, and payload 1004 independently.

In some embodiments, the movable object 1000 can be configured to communicate with another remote device in addition to the terminal 1012, or instead of the terminal 1012. The terminal 1012 may also be configured to communicate with another remote device as well as the movable object 1000. For example, the movable object 1000 and/or terminal 1012 may communicate with another movable object, or a carrier or payload of another movable object. When desired, the remote device may be a second terminal or other computing device (e.g., computer, lap tablet, smartphone, or other mobile device). The remote device can be configured to transmit data to the movable object 1000, receive data from the movable object 1000, transmit data to the terminal 1012, and/or receive data from the terminal 1012. Optionally, the remote device can be connected to the Internet or other telecommunications network, such that data received from the movable object 1000 and/or terminal 1012 can be uploaded to a website or server.

Figure 11:
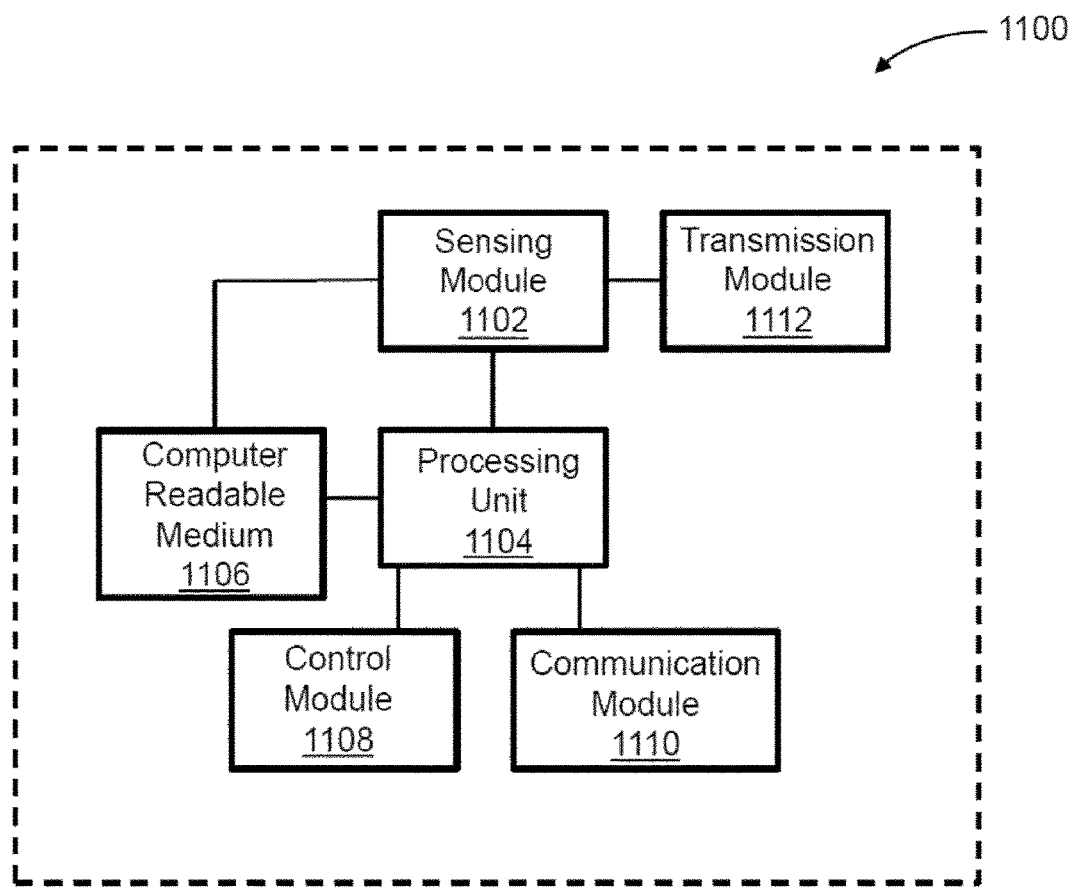
FIG. 11 is a schematic illustration by way of block diagram of a system for controlling a movable object, in accordance with embodiments.

FIG. 11 is a schematic illustration by way of block diagram of a system 1100 for controlling a movable object, in accordance with embodiments. The system 1100 can be used in combination with any suitable embodiment of the systems, devices, and methods disclosed herein. The system 1100 can include a sensing module 1102, processing unit 1104, non-transitory computer readable medium 1106, control module 1108, and communication module 1110.

The sensing module 1102 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1102 can be operatively coupled to a processing unit 1104 having a plurality of processors. In some embodiments, the sensing module can be operatively coupled to a transmission module 1112 (e.g., a Wi-Fi image transmission module) configured to directly transmit sensing data to a suitable external device or system. For example, the transmission module 1112 can be used to transmit images captured by a camera of the sensing module 1102 to a remote terminal.

The processing unit 1104 can have one or more processors, such as a programmable processor (e.g., a central processing unit (CPU)). The processing unit 1104 can be operatively coupled to a non-transitory computer readable medium 1106. The non-transitory computer readable medium 1106 can store logic, code, and/or program instructions executable by the processing unit 1104 for performing one or more steps. The non-transitory computer readable medium can include one or more memory units (e.g., removable media or external storage such as an SD card or random access memory (RAM)). In some embodiments, data from the sensing module 1102 can be directly conveyed to and stored within the memory units of the non-transitory computer readable medium 1106. The memory units of the non-transitory computer readable medium 1106 can store logic, code and/or program instructions executable by the processing unit 1104 to perform any suitable embodiment of the methods described herein. For example, the processing unit 1104 can be configured to execute instructions causing one or more processors of the processing unit 1104 to analyze sensing data produced by the sensing module. The memory units can store sensing data from the sensing module to be processed by the processing unit 1104. In some embodiments, the memory units of the non-transitory computer readable medium 1106 can be used to store the processing results produced by the processing unit 1104.

In some embodiments, the processing unit 1104 can be operatively coupled to a control module 1108 configured to control a state of the movable object. For example, the control module 1108 can be configured to control the propulsion mechanisms of the movable object to adjust the spatial disposition, velocity, and/or acceleration of the movable object with respect to six degrees of freedom. Alternatively or in combination, the control module 1108 can control one or more of a state of a carrier, payload, or sensing module.

The processing unit 1104 can be operatively coupled to a communication module 1110 configured to transmit and/or receive data from one or more external devices (e.g., a terminal, display device, or other remote controller). Any suitable means of communication can be used, such as wired communication or wireless communication. For example, the communication module 1110 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1110 can transmit and/or receive one or more of sensing data from the sensing module 1102, processing results produced by the processing unit 1104, predetermined control data, user commands from a terminal or remote controller, and the like.

The components of the system 1100 can be arranged in any suitable configuration. For example, one or more of the components of the system 1100 can be located on the movable object, carrier, payload, terminal, sensing system, or an additional external device in communication with one or more of the above. Additionally, although FIG. 11 depicts a single processing unit 1104 and a single non-transitory computer readable medium 1106, one of skill in the art would appreciate that this is not intended to be limiting, and that the system 1100 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1100 can occur at one or more of the aforementioned locations.

As used herein A and/or B encompasses one or more of A or B, and combinations thereof such as A and B.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. An apparatus for controlling an attitude of a payload, comprising:
    a carrier comprising:
        a first frame, the payload being affixed to the first frame; and
        a second frame rotatably coupled to a movable object;
    one or more first sensors disposed on the payload and configured to measure one or more motion characteristics of the payload;
    one or more second sensors disposed on the carrier and configured to measure one or more motion characteristics of the carrier; and
    one or more processors individually or collectively configured to:
        determine an input torque based on the one or more motion characteristics of the payload;
        determine an estimated disturbance torque based on the one or more motion characteristics of the carrier; and
        calculate an output torque based on the input torque and the estimated disturbance torque, the output torque being configured to effect movement of the second frame to achieve a desired attitude of the payload.

2. The apparatus of claim 1, further comprising:
    the movable object; and
    a damping element disposed between the movable object and the carrier;
    wherein the carrier is a multi-axis gimbal.

3. The apparatus of claim 2, wherein the second frame is coupled to the movable object via the damping element.

4. The apparatus of claim 3, wherein the second frame is coupled to the damping element via a coupling structure, and the one or more second sensors are disposed on the coupling structure.

5. The apparatus of claim 4, wherein the one or more second sensors are provided on a flexible printed circuit (FPC) attached to the coupling structure.

6. The apparatus of claim 1, wherein the second frame is coupled to a motor configured to rotate the second frame about a yaw axis and the one or more second sensors are disposed on the second frame or the motor.

7. The apparatus of claim 1, wherein the estimated disturbance torque is determined by inputting the one or more motion characteristics of the carrier into a predefined dynamics-based model of the carrier.

8. The apparatus of claim 7, wherein the one or more motion characteristics of the carrier comprise at least a linear acceleration or an angular acceleration of the carrier.

9. The apparatus of claim 7, wherein the one or more motion characteristics of the carrier are associated with one or more motion characteristics of the second frame.

10. The apparatus of claim 1, wherein the estimated disturbance torque is calculated with respect to a rotatable joint on the second frame, the rotatable joint being configured to couple the second frame to the movable object.

11. The apparatus of claim 1, wherein the estimated disturbance torque is refined using a proportional-derivative (PD) controller to obtain a refined disturbance torque.

12. The apparatus of claim 11, wherein the estimated disturbance torque is refined by applying one or more filters to the estimated disturbance torque.

13. The apparatus of claim 11, wherein the output torque is calculated based on the input torque and the refined disturbance torque.

14. The apparatus of claim 1, wherein the input torque is determined using a feedback control loop.

15. The apparatus of claim 14, wherein the feedback control loop is implemented using at least one proportional-derivative (PD) controller, the at least one PD controller comprising a PD controller configured to calculate an output angular velocity based on a difference between an instantaneous angle measured by the one or more sensors on the payload and the input angle.

16. The apparatus of claim 15, wherein: the PD controller is a first PD controller; and the at least one PD controller further comprises a second PD controller configured to calculate the input torque based on a difference between an instantaneous angular velocity measured by the one or more sensors on the payload and the output angular velocity.

17. The apparatus of claim 1, wherein the output torque is calculated by compensating the input torque with the estimated disturbance torque.

18. The apparatus of claim 17, wherein the output torque is calculated by subtracting the estimated disturbance torque from the input torque.

19. The apparatus of claim 17, wherein the output torque is used in conjunction with an actual disturbance torque to effect the movement of the carrier to achieve the desired attitude of the payload.

20. The apparatus of claim 19, wherein the actual disturbance torque results from a disturbance to the carrier and is applied to the second frame.

* * * * *